United States Patent
Kanai

(10) Patent No.: US 8,493,603 B2
(45) Date of Patent: Jul. 23, 2013

(54) PRINTING APPARATUS PRINTING METHOD FOR CONTROLLING TO STOP EXECUTING PRINT JOB AND STORAGE MEDIUM STORING PROGRAM THEREOF

(75) Inventor: Yasunori Kanai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/177,349

(22) Filed: Jul. 6, 2011

(65) Prior Publication Data

US 2011/0261385 A1 Oct. 27, 2011

Related U.S. Application Data

(62) Division of application No. 11/535,125, filed on Sep. 26, 2006, now abandoned.

(30) Foreign Application Priority Data

Oct. 4, 2005 (JP) .................. 2005-291765

(51) Int. Cl.
*G06F 3/12* (2006.01)
*G06K 15/00* (2006.01)

(52) U.S. Cl.
USPC ......................................... 358/1.15; 358/1.14

(58) Field of Classification Search
USPC ................. 358/1.1, 1.8, 1.9, 1.13, 1.14, 1.15, 358/1.18, 400, 468, 474; 399/9, 7, 81; 347/12.14, 129
See application file for complete search history.

(56) References Cited

U.S. PATENT DOCUMENTS

| | | | | |
|---|---|---|---|---|
| 5,023,631 A | * | 6/1991 | Negishi et al. | 347/129 |
| 5,511,150 A | * | 4/1996 | Beaudet et al. | 358/1.14 |
| 5,532,792 A | * | 7/1996 | Hattori | 399/76 |
| 5,771,103 A | * | 6/1998 | Ogino | 358/437 |
| 6,469,795 B2 | * | 10/2002 | Beaudet et al. | 358/1.14 |
| 6,906,813 B1 | * | 6/2005 | Tuchitoi et al. | 358/1.14 |
| 2005/0052679 A1 | * | 3/2005 | Green et al. | 358/1.14 |
| 2007/0109586 A1 | * | 5/2007 | Yamada et al. | 358/1.14 |

* cited by examiner

*Primary Examiner* — Gabriel Garcia
(74) *Attorney, Agent, or Firm* — Cowan, Liebowitz & Latman, P.C.

(57) ABSTRACT

A job processing method in a printing system having a printing apparatus which can accept a plurality of kinds of print jobs, wherein a print stop request of a print job which is to be printed by the printing apparatus is enabled by a user via a user interface section; and if a print job which is an object of a print stop is a print job which requires printing for a plurality of copies, the print stop processing of the print job is enabled by the printing apparatus in the print stop processing method based on a request from a user inputted via said user interface section in a plurality of kinds of print stop processing methods which can be executed in the printing apparatus.

12 Claims, 13 Drawing Sheets

PRINTING APPARATUS PRINTING METHOD FOR CONTROLLING TO STOP EXECUTING PRINT JOB AND STORAGE MEDIUM STORING PROGRAM THEREOF

CROSS-REFERENCE TO RELATED APPLICATION

This application is a divisional of application Ser. No. 11/535,125, filed Sep. 26, 2006, the entire disclosure of which is hereby incorporated by reference.

BACKGROUND OF THE INVENTION

1. Field of the Invention

The present invention relates to a printing apparatus, a job processing method, a printing system, a storage medium, and a program, which are capable of performing printing processes involving a plurality of copies.

2. Description of the Related Art

When a user presses a stop key during a printing process in a printing apparatus such as a printer, a copying machine, a facsimile or the like, the printing process is typically stopped immediately, or else at the earliest opportunity. Subjects for printing herein include text, photographs, computer graphics, and combinations of these as appropriate; collectively, these will be referred to herein as printed images. For example, if image printing for a plurality of printing papers is being processed, printing paper-feeding processes and image printing processes are stopped after the stop key is pressed. Additionally, sheets of printing paper previously fed from a printing paper feed tray are immediately ejected into a printing paper discharge tray. Recently, an image printing apparatus which enables printed images to be printed according to the number of copies, of which a copy is a unit of a plurality of printing papers, has also been proposed. An image printing apparatus including a finisher with a function of stapling on a per-copy basis after printing is also in practical use. When a stop key is pressed during the processing of image printing of printing of plural copies, image printing of all the printed images comprising a copy is not completed. Therefore, the stapling process is typically stopped as well.

In such a case, it is necessary to eliminate such problems as having sheets of printing paper left behind in the finisher as a consequence of the stapling process being stopped, after image printing is done. For this reason, a technique for enabling a stopping process to be executed at a boundary between copies in image printing processing when the stop key is pressed during image printing of plural copies is also proposed (see Patent Document 1).

[Patent Document 1] U.S. Pat. No. 5,771,103

SUMMARY OF THE INVENTION

There are various reasons for a user to press the stop key, however, depending on circumstances, and it is anticipated it may be difficult to gain the user's satisfaction in some cases. For example, it is conceivable that immediately after a user requests an image printing job for a plurality of copies from an image printing apparatus, the printing process derived from the image printing job of plural copies becomes unnecessary, and a stop key is pressed. It is highly likely that the desired stop process in this instance will be to immediately stop the print process.

On the other hand, it is also conceivable that when processing image printing for a job of image printing of plural copies for materials for distribution or other instance where the number of copies depends on the number of intended recipients, a stop key is pressed because the start time for a meeting is close at hand, imposing time constraints on the user. It is highly likely that the stop processing desired by the user in this instance will be to stop processing at the copy unit boundary between copies to be image printed.

In the aforementioned stop processing, a user will not necessarily want stop processing only to be executed at the earliest such boundary between copies. Furthermore, it would be possible to improve usability for the user if it were possible either to direct stop processing to be executed after some number of copies were image printed, or if the preset number of copies could be changed.

There are other concerns, such as the following, even if one considers assemblages such as those given in the prior art, foregoing.

For example, the assemblage given in the prior art the method of print stop processing for a job for which print stop processing is desired would be rigidly determined based on the results of choices made by the user prior to starting printing as to whether or not particular printing settings are to be set, such as whether the job is a stapling job. In other words, the printing device itself determines the way in which print stop processing of a job for which print stop processing is desired is arbitrarily determined, on its own initiative, based on indirect factors, and thus, does not reflect the intent of the user who desires print stop processing. In such a configuration, it is difficult to stop printing in a print stop processing method that does reflect the intent of the user who desires print stop processing. That is to say, addressing the various needs of users who desire the abovementioned print stop processing is difficult.

In view of such various states, it is desirable to flexibly address various needs from various users relating to print stop requests for print jobs by considering the environment under which the apparatus is used. At the same time, it is desirable to facilitate a usable and convenient printing environment as well.

Therefore, the present invention is intended to provide a usable and convenient printing environment which can flexibly address needs from various users relating to print stop requests of print jobs by considering such factors as the environment in which a printing apparatus is used.

An invention according to an embodiment of the present invention provides a job processing method in a printing system having a printing apparatus which can accept a plurality of kinds of print jobs. This job processing method comprises the steps of: accepting a print stop request of the print job by the printing apparatus via a user interface section; and if the print job for which the print stop request is issued is a print job for executing printing for plural copies, performing the print stop processing of the print job by the printing apparatus with one of print stop processing methods based on the print stop request inputted via the user interface section.

An invention according to another embodiment of the present invention provides a job processing method in a printing system having a printing apparatus which can accept a plurality of kinds of print jobs. This job processing method comprises the steps of: accepting a print stop request of the print job by the printing apparatus via a user interface section; if the print job for which the print stop request is issued is a print job for executing printing for plural copies, performing the print stop processing of the print job by the printing apparatus with one of print stop processing methods based on the print stop request inputted via the user interface section; and if the print job for which the print stop request is issued is a print job which does not need to print plural copies, performing the print stop processing of the print job by the printing apparatus with one of print stop processing methods without requiring the print stop processing method being selected by the user interface section.

An invention according to another embodiment of the present invention provides a job processing method in a printing system comprising a printing apparatus which can accept a plurality of kinds of print jobs, and a post-processing section which can execute sheet processing on a printing paper from the printing apparatus. This job processing method comprises the steps of: accepting a print stop request of print job by the printing apparatus via a user interface section; if the print job for which the print stop request is issued is a print job for executing printing for plural copies, performing the print stop processing of the print job by the printing apparatus with one of print stop processing methods based on the print stop request inputted via the user interface section regardless of whether the print job is a print job which requires sheet processing by the post-processing section or the print job is a print job which does not need the sheet processing by the post-processing section.

An invention according to another embodiment of the present invention provides a job processing method in a printing system comprising a printing apparatus which can accept a plurality of kinds of print jobs, and a post-processing section which can execute sheet processing on a printing paper from the printing apparatus. This job processing method comprises the steps of: accepting a print stop request of the print job by the printing apparatus via a user interface section; if the print job for which the print stop request is issued is a print job for executing printing for plural copies, performing the print stop processing of the print job by the printing apparatus with one of print stop processing methods based on print stop request inputted via the user interface section regardless of whether the print job is a print job which requires sheet processing by the post-processing section or the print job is a print job which does not need the sheet processing by the post-processing section; and if the print job for which the print stop request is issued is a print job which does not need to print plural copies, performing the print stop processing of the print job by the printing apparatus with one of the print stop processing methods without requiring the print stop processing method to be selected by the user interface section regardless of whether the print job is a print job which requires sheet processing by the post-processing section or the print job is a print job which does not need the sheet processing by the post-processing section.

An invention according to an embodiment of the present invention provides a printing system having a printing apparatus which can accept a plurality of kinds of print jobs. This printing system comprises: an accepting unit adapted to accept a print stop request of the print job by the printing apparatus via a user interface section; and a performing unit adapted to perform, if the print job for which the print stop request is issued is a print job for executing printing for plural copies, the print stop processing of the print job by the printing apparatus with one of print stop processing methods based on the print stop request inputted via the user interface section.

An invention according to another embodiment of the present invention provides a printing system having a printing apparatus which can accept a plurality of kinds of print jobs. This printing system comprises: an accepting unit adapted to accept a print stop request of the print job by the printing apparatus via a user interface section; a first performing unit adapted to perform, if the print job for which the print stop request is issued is a print job for executing printing for plural copies, the print stop processing of the print job by the printing apparatus with one of print stop processing methods based on the print stop request inputted via the user interface section; and a second performing unit adapted to perform, if the print job for which the print stop request is issued is a print job which does not need to print plural copies, the print stop processing of the print job by the printing apparatus with one of print stop processing methods without requiring the print stop processing method being selected by the user interface section.

An invention according to another embodiment of the present invention provides a printing system comprising a printing apparatus which can accept a plurality of kinds of print jobs, and a post-processing section which can execute sheet processing on a printing paper from the printing apparatus. This printing system comprises: an accepting unit adapted to accept a print stop request of print job by the printing apparatus via a user interface section; a performing unit adapted to perform, if the print job for which the print stop request is issued is a print job for executing printing for plural copies, the print stop processing of the print job by the printing apparatus with one of print stop processing methods based on the print stop request inputted via the user interface section regardless of whether the print job is a print job which requires sheet processing by the post-processing section or the print job is a print job which does not need the sheet processing by the post-processing section.

An invention according to another embodiment of the present invention provides a printing system comprising a printing apparatus which can accept a plurality of kinds of print jobs, and a post-processing section which can execute sheet processing on a printing paper from the printing apparatus. This printing system comprises: an accepting unit adapted to accept a print stop request of the print job by the printing apparatus via a user interface section; a first performing unit adapted to perform, if the print job for which the print stop request is issued is a print job for executing printing for plural copies, the print stop processing of the print job by the printing apparatus with one of print stop processing methods based on print stop request inputted via the user interface section regardless of whether the print job is a print job which requires sheet processing by the post-processing section or the print job is a print job which does not need the sheet processing by the post-processing section; and a second performing unit adapted to perform, if the print job for which the print stop request is issued is a print job which does not need to print plural copies, the print stop processing of the print job by the printing apparatus with one of the print stop processing methods without requiring the print stop processing method to be selected by the user interface section regardless of whether the print job is a print job which requires sheet processing by the post-processing section or the print job is a print job which does not need the sheet processing by the post-processing section.

The invention according to further another embodiment provides a printing apparatus for executing the job processing methods of the embodiment of the present invention.

An invention according to still further another embodiment of the present invention provides a computer readable storage medium for executing the job processing methods of the embodiments of the present invention.

Inventions pertaining to embodiments of the present invention provide for computer programs stored in storage medium for causing a computer to execute the job processing methods of the embodiments of the present invention.

The present invention facilitates a user-friendly and convenient printing environment which can flexibly address needs from various users relating to print stop requests for print jobs in typical circumstances under which printing apparatus would be utilized.

Further features of the present invention will become apparent from the following description of exemplary embodiments with reference to the attached drawings.

DESCRIPTION OF THE EMBODIMENTS

First Embodiment

Figure 1:
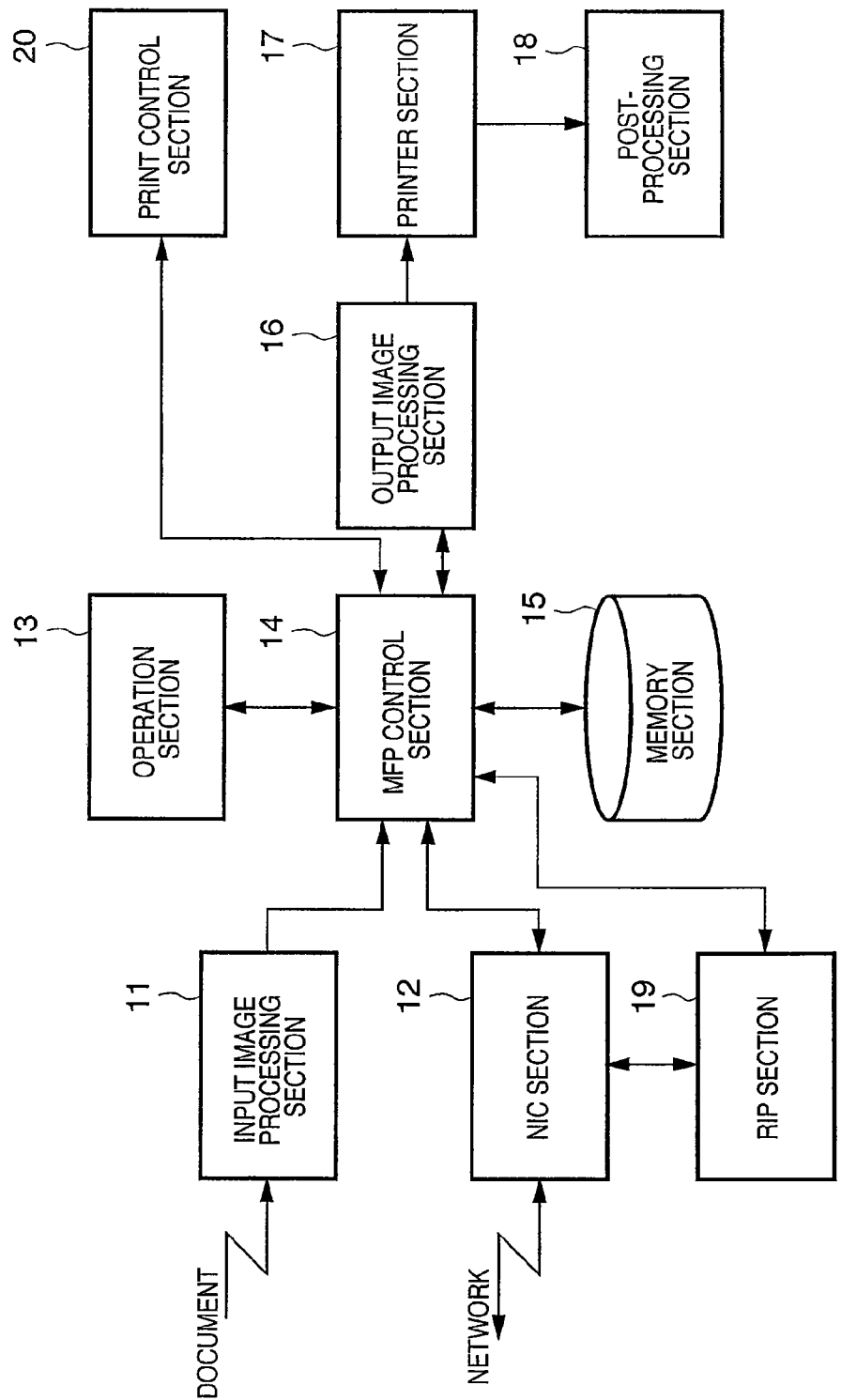
FIG. 1 is a block diagram for illustrating a configuration of an MFP.

First, using FIG. 1, a configuration of an MFP (Multi Function Peripheral) as an example of a printing apparatus will be described. Although not shown in FIG. 1, a printing system of the embodiment further includes a peripheral device such as a host computer and the like which can communicate data with the printing apparatus. A post-processing section 18 of FIG. 1 is a device for executing sheet processing on a printing paper from a printer section 17 in the embodiment. Therefore, it is also called a sheet processing apparatus. The post-processing section 18 may be a device included in the printing apparatus. Or, it may be a post-processing section connectable to the printing apparatus as an optional equipment of the printing apparatus. As such, it is probable that a system configuration of the embodiment may be changed as required.

In the figure, an input image processing section 11 reads a sheet of document or the like by an image reading apparatus such as a scanner or the like, and executes data processing of the read image data. An NIC (Network Interface Card) section 12 transfers image data (mainly PDL (Page Description Language) data) which is inputted by using a network to a RIP (Raster Image Processor) section 19. It further sends image data or apparatus information inside the MFP to outside via a network as required. The RIP section 19 has a function of decoding inputted PDL data and rasterizing it into image data in a raster form.

Next, image data inputted through the input image processing section 11 or the NIC section 12 is sent to an MFP control section 14. The MFP control section 14 controls inputted image data or image data to be outputted. The image data inputted into the MFP control section 14 is once stored in a memory section 15. The stored image data is temporally stored in the memory section 15 or read out from the memory section 15 as required.

An output image processing section 16 performs image processing for printing on the image data, and sends the processed image data to the printer section 17. The printer section 17 feeds printing paper and prints image data generated at the output image processing section 16 on the printing papers piece by piece. The printed printing paper is sent to the post-processing section 18 and subject to sorting processing or printing paper finishing processing.

An operation section 13 is an input device for a user to select or designate the various processes or functions mentioned above. Further, the operation section 13 is provided with a display device. As the resolution of the display device improves, the display device of the operation section 13 can preview image data in the memory section 15 and also can be used to print image data after checking the data and if no problems are found. As such, the MFP has various functions and types of usage. Some examples of functions will be shown along with an image data flowchart below.

A) copy function: input image processing section 11→output image processing section 16→printer section 17

B) network scanning function: input image processing section 11→NIC section 12

C) network printing function: NIC section 12→RIP section 19→output image processing section 16→printer section 17

D) box scanning function: input image processing section 11→output image processing section 16→memory section 15

E) box printing function: memory section 15→printer section 17

F) box receiving function: NIC section 12→RIP section 19→output image processing section 16→memory section 15

G) box transmitting function: memory section 15→NIC section 12

H) preview function: memory section 15→operation section 13

Figure 2:
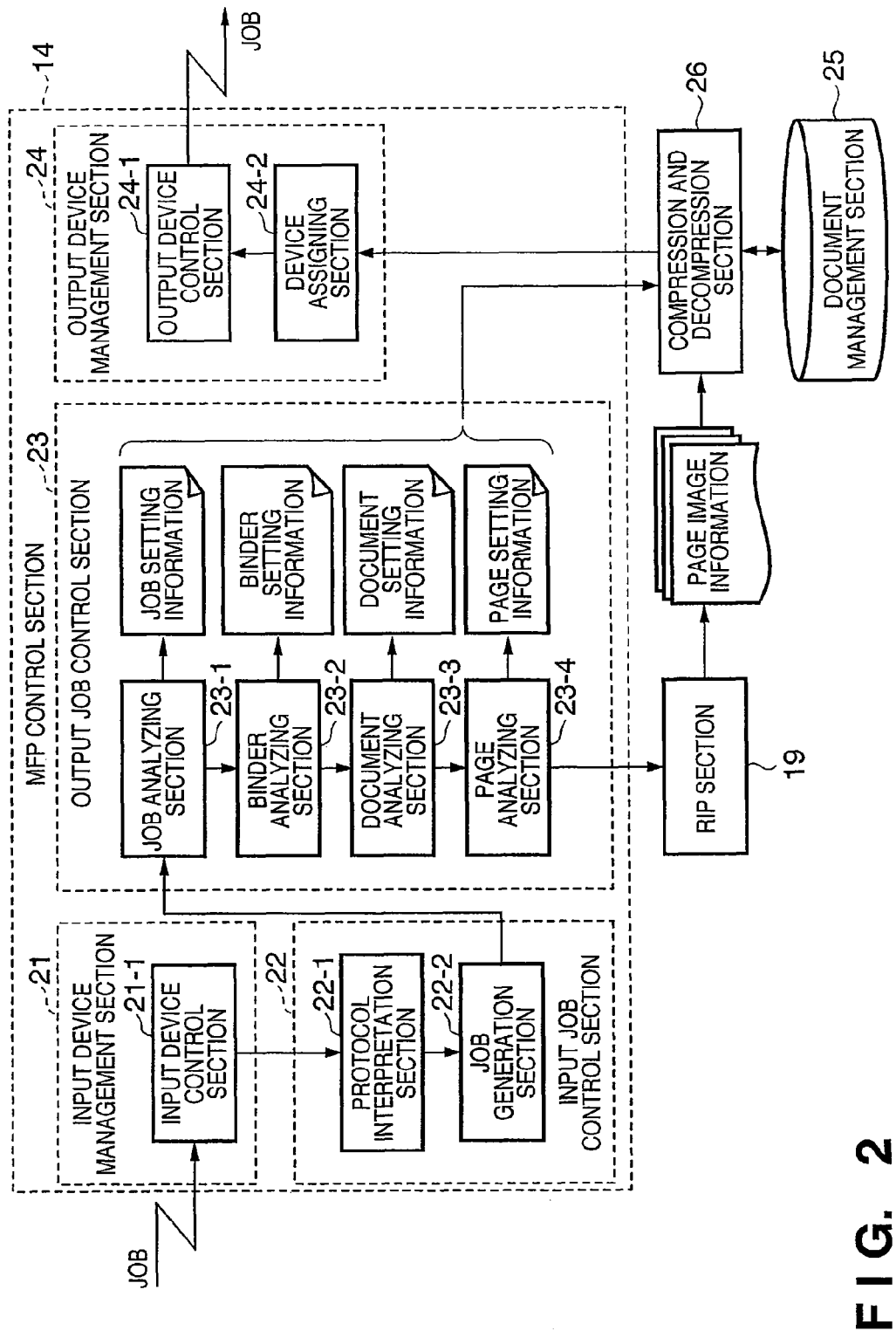
FIG. 2 is a block diagram for illustrating a MFP control section.

The MFP control section 14 for controlling each function mentioned above will be described using FIG. 2. The MFT control section 14 shown in FIG. 2 is chiefly comprised of four parts. That is to say, an input device management section 21 for managing the input device, an input job control section 22 for interpreting an inputted job, an output job control section 23 for arranging setting information of an inputted job, and an output device management section 24 for assigning an output device.

The input device management section 21 arranges image data from each input section in FIG. 1 and plays a role of deciding an order to switch image data. Here, an input device control section 21-1 is present. Inputted image data sent via an interface includes image data inputted from outside the MPF such as scanned image data of a document and PDL image data transmitted via a network. Furthermore, image data and the like processed inside the MFP such as a reprint of image data stored in a document management section 25, an output from both the RIP section 19 and the output image processing section 16 are also included.

Next, the input job control section 22 consists of a protocol interpretation section 22-1 and a job generation section 22-2.

A series of operation requests sent from the input device control section 21-1 of the input device management section 21 is received in the form of a command signal called a command (protocol). Then, the contents of the operation request are interpreted at the protocol interpretation section 22-1 and are converted into an operation procedure which can be understood inside the MFP. Meanwhile, the job generation section 22-2 generates various jobs including a printing job, a scanning job, a PDL rasterizing job, a facsimile receiving job and the like. A scenario is defined for each of the generated jobs, such as what kind of process is performed on it in the MFP section, where it is sent to and the like. Each of the generated jobs flows in the MFP section according to the scenario.

In the output job control section 23, setting information for a job (commonly called a job ticket) and image information are created at a job analyzing section 23-1, a binder analyzing section 23-2, a document analyzing section 23-3 and a page analyzing section 23-4. In the job analyzing section 23-1, details of setting information that apply to the entire job including the document name or the number of printing copies of image data to be printed, an instruction of a discharge tray of an output destination and the order of binders for a job consisting of a plurality of binders are analyzed. In the binder analyzing section 23-2, details of setting information on the entire of a binder including a setting of a bookbinding system or the place to be stapled, the order of documents in a binder consisting of a plurality of documents and the like are analyzed.

In the document analyzing section 23-3, details of setting information on the entire printing document including the order of pages of a printing document consisting of a plurality of pages, a specification of double-sided printing, addition of a cover page or an inserting printing paper are analyzed. In the page analyzing section 23-4, details of setting information on the entirety of various setting pages including a resolution of a printing document, a direction of the printing document (landscape/portrait) and the like are analyzed. Further, when PDL data is inputted, the RIP section 19 is called and rasterizing processing is performed. In order to generate image information, the RIP section 19 is called and page image information is generated through rasterizing processing. Page image information is compressed at the compression/expansion section 26 and then stored in the document management section 25 in association with the setting information.

The output device management section 24 consists of an output device control section 24-1 and a device assigning section 24-2. The image information saved in the document management section 25 is expanded at the compression/expansion section 26 and read out together with the associated setting information. Then, the setting information and the image information are sent in pairs to the output device management section 24.

The device assigning section 24-2 assigns a corresponding output device based on a scenario of the respective defined job. As a plurality of jobs are processed at the same time, however, devices are competing with each other; thus, it plays a role of arbitrating them. The output device control section 24-1 schedules the use of each of the devices such as the printer section 17, the post-processing section 18 and the like.

Figure 3:
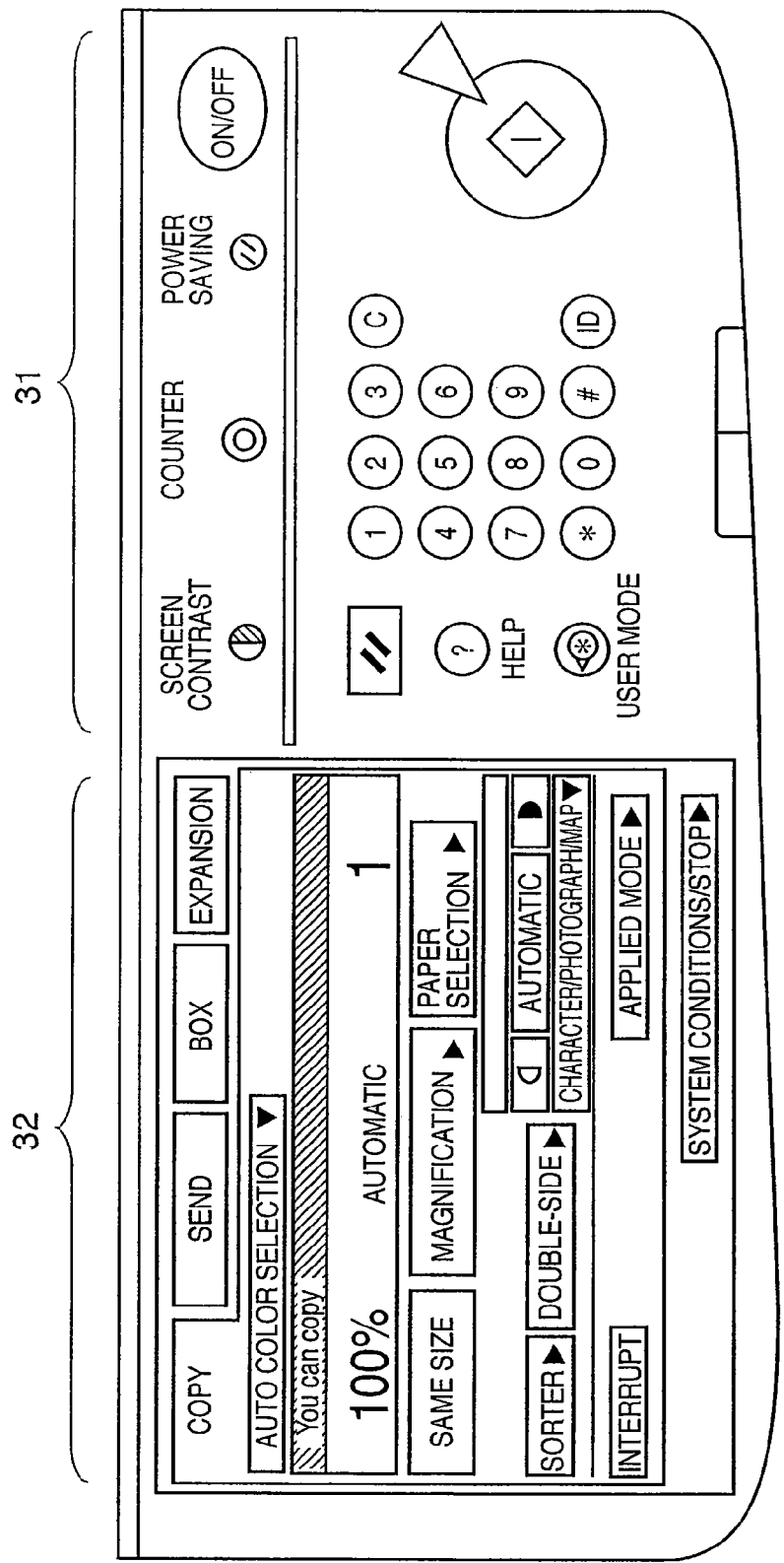
FIG. 3 is a schematic diagram for illustrating an operation section.
Figure 4:
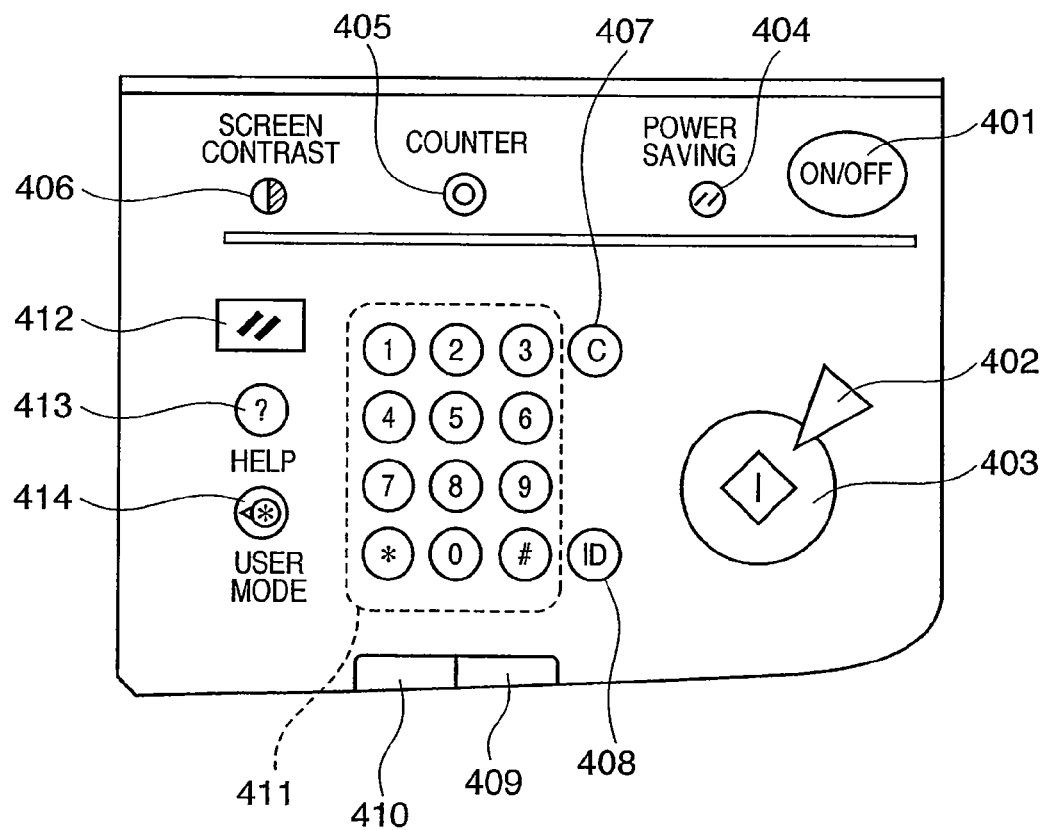
FIG. 4 is a schematic diagram for illustrating a key input section of the operation section.
Figure 5:
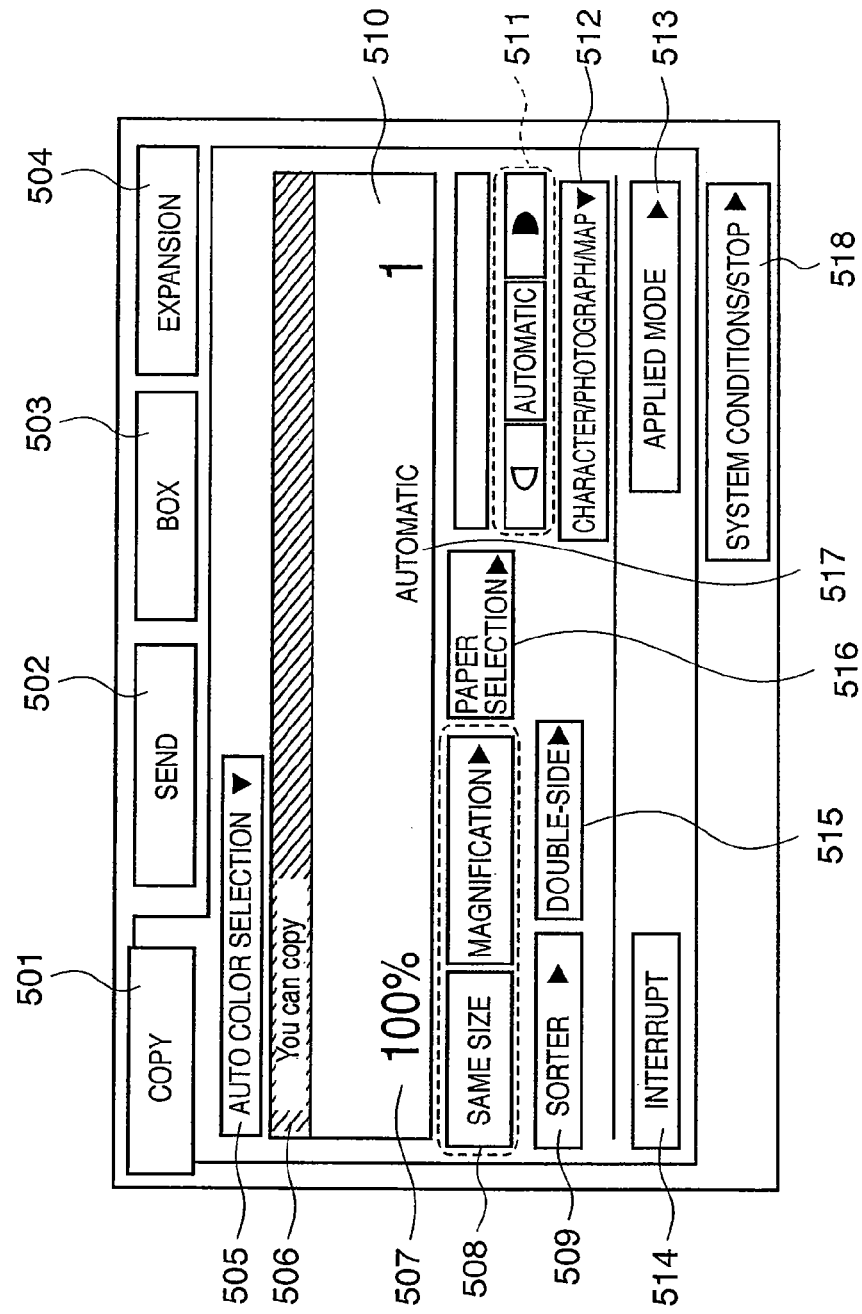
FIG. 5 is a schematic diagram for illustrating a touch panel section of the operation section.

Next, the operation section 13 will be described with reference to FIG. 3. FIG. 3 represents the operation section 13 of the MFP and consists of a touch panel section 32 including a key input section 31 and a liquid display section having the touch panel section 32. FIG. 4 and FIG. 5 show details of the key input section 31 and the touch panel section 32, which will be detailed below respectively.

First, FIG. 4 is a key input section 31 in FIG. 3 which can perform a steady operation setting. A power source switch 401 is for switching between a standby mode (general operation state) and a sleep mode. The sleep mode refers to a state where a main controller is in waiting state for a network printer, a facsimile or the like and stops a program in an interruption waiting state to restrain power consumption. That enables it to start their control when a main power switch (not shown) for providing power supply to the entire system is turned ON.

A power saving key 404 is a key which can save power consumption by decreasing a control temperature of a fixing unit in a printer device while in a standby mode even if it requires a time to enter in a printable state. The control temperature of a fixing unit can be decreased by setting a power conservation rate. A start key 403 is a key for indicating to start copying or sending. A stop key 402 is a key for interrupting them.

A ten key 411 is a key for inputting numerals for various settings. A clear key 407 is a key for releasing the inputted numerals. An ID key 408 is a key for a user of the MFP to input a preset password for authentication. A reset key 412 is a key for invalidating various settings and returning them to a default state. A help key 413 is a key for displaying guidance or a help. A user mode key 414 is a key for transferring to a system setting screen image on a per user basis.

A counter checking key 405 is a key for displaying the outputted number stored in a soft counter for counting the number of prints or the like provided in the MFP. With the key, respective outputted numbers can be displayed according to an operation mode such as copy/print/scan/facsimile, a color mode such as color/monochrome, a printing sheet size such as large/small, and the like.

Furthermore, an image contrast dial 406 is a dial for adjusting visual recognition by dimming a backlight of a liquid crystal section of a touch panel section 32.

An execution/memory lamp 410 is a lamp for informing that a job is being executed or the memory is being accessed by flashing. An error lamp 409 is a lamp for informing an error such that a job cannot be executed or a service person call, or a user call which informs of a jam or lack of consumables by flashing.

Next, FIG. 5 is a schematic diagram showing a touch panel section 32 consisting of an LCD (Liquid Crystal Display) and a transparent electrode affixed to the top surface. It is initially programmed to detect a touch and display another operation screen image or the like when a part of the transparent electrode corresponding to a key displayed on the LCD is touched by a finger. FIG. 5 is an initial screen image in a standby mode, enabling the display of various operation screen images according to setting operations.

A copy tab 501 is a tab key for transferring to an operation screen image of a copy operation. A sending tab 502 is a tab key for transferring to an operation screen image for indicating a send operation such as facsimile or E-mail sending. A box tab 503 is a tab key for transferring to a screen image for inputting or outputting a job into or out from a box (a storage device for storing a job for each user). An option tab 504 is a tab key for setting an extended function as a scanner setting. A system monitor key 518 is a key for displaying a state or a condition of the MFP. It can transfer to each operation mode by selecting each tab key.

A color mode selection set key 505 is a key for previously selecting from a color copy, a monochrome copy, or an automatic selection. A magnification set key 508 is a key for transferring to a screen image for setting magnification such as same size as original, enlargement or reduction. A post-processing set key 509 is a key for transferring to a screen image for setting the presence, the number and the location of stapling or punching. Furthermore, a double-side set key 515 is a key for transferring to a screen image for selecting between a single-sided printing and a double-sided printing. A sheet size set key 516 is a key for transferring to a screen image for selecting a printing paper feed stage, a size of sheet, or a medium type. An image mode set key 512 is a key for selecting an image mode appropriate for document image such as a text mode or a photograph mode. An exposure set key 511 is a key for adjusting exposure of an output image to darker or lighter.

Next, a status display section 506 is a display section for performing simple state displaying such as a standby state, being warmed up, a jam, an error or the like. A magnification display section 507 displays a magnification set by the magnification set key 508. A sheet size display section 517 displays the sheet size or a mode set by the sheet size set key 516. A number of sheets display section 510 displays the number of sheets specified by the ten-key 411 or displays the number of page being printed during the operation.

Furthermore, an interruption key 514 is used to interrupt another job during a copying operation. An applied mode key 513 is a key for transferring to a screen image for setting various types of image processing or layouts including page sequential exposure, cover page and inserting printing paper, a reduction layout and image movement.

Next, a mechanical configuration of the MFP (Multi Function Peripheral) will be described using FIG. 6.

Figure 6:
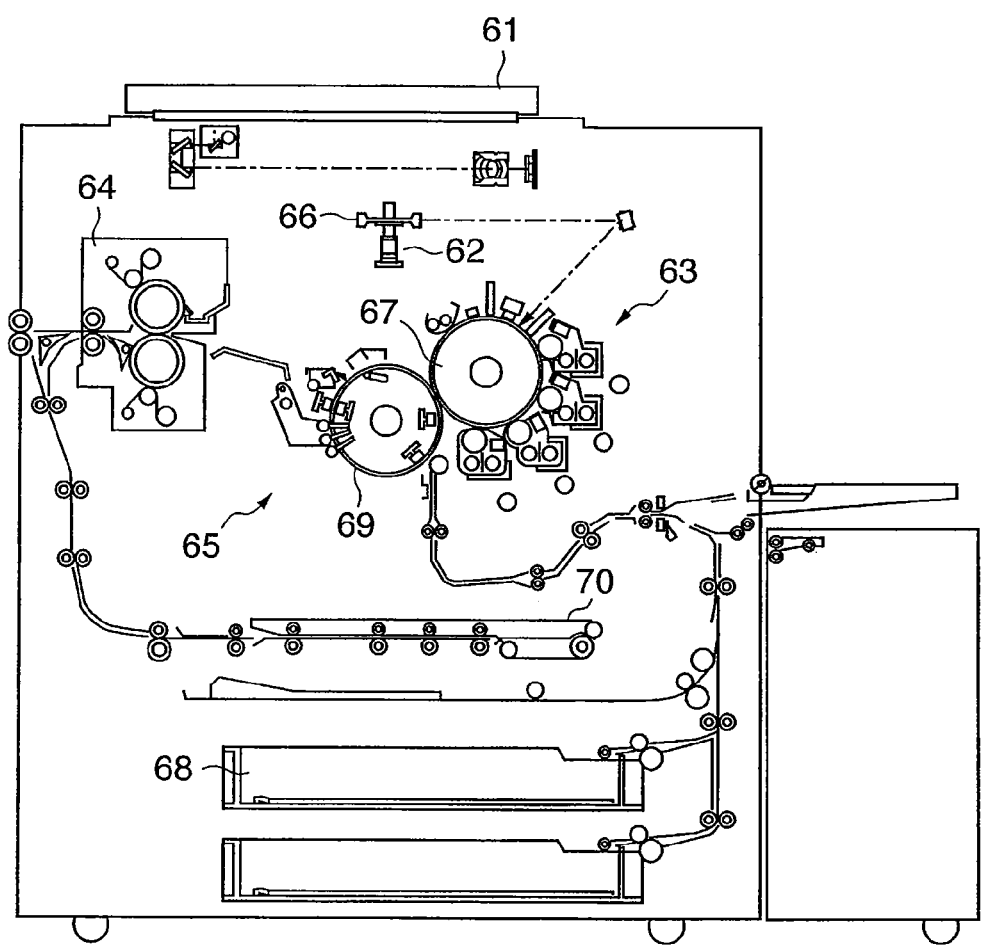
FIG. 6 is a cross sectional view for illustrating an MFP (in a 1D color system)

In FIG. 6, the MFP consists of a scanner section 61, a laser exposure section 62, an image creation section 63, a fixing section 64, a feed/carrying section 65 and a print control section 20 shown in FIG. 1 for controlling over them. A role of the print control section 20 may be executed by the MFP control section 14. A scanner section 61 illuminates a document placed on a document table, optically reads the document image, converts the image into an electrical signal and creates image data.

A laser exposure section 62 causes a light beam such as a laser beam modulated according to the image data to income into a rotating multifaceted mirror (polygon mirror) 66, which rotates at an isogonic rate, and illuminates it onto a photosensitive drum 67 as a reflected scan light. The image creation section 63 drives rotating of the photosensitive drum 67 and charges it by a charger and develops a latent image formed on the photosensitive drum 67 by the laser exposure section 62 with toner. Then, the toner image is transferred to a printing paper, and a series of electronic photograph processes such as collecting a slight toner remaining on the photosensitive drum 67 left after the transferring at that moment are executed and an image is created.

At the moment, developing units (developing stations) for each of magenta (M), cyan (C), yellow (Y) and black (K) with each toner repeatedly execute the electronic photograph processes in order one after another, while the printing paper is winding around a predetermined position of a transferring belt and rotating four times. After four rotations, the printing paper with a full color toner image of four colors transferred on it leaves a transferring drum 69 and is carried to the fixing section 64. The fixing section 64 consists of a combination of rollers and belts. The fixing section 64 includes a heat source such as a halogen heater inside for applying toner to a printing paper on which a toner image is transferred by the image creation section 63 to be dissolved and fixed by heat and pressure.

The sheet feed/carriage section 65 has one or more printing paper stockers 68 represented as a printing paper cassette or a stack of paper. Then, a sheet is separated from a plurality of printing papers stocked in the printing paper stocker 68 according to an instruction from the print control section 20, and carried to an image creation section 63 and a fixing section 64. The printing paper is wound around the transferring drum 69 of the image creation section 63, and after four rotations, is carried to the fixing section 64. A toner image in each color of the abovementioned YMCK is transferred on the printing paper during the four rotations. If images are to be formed on both sides of the printing papers, the printing papers passed through the fixing section 64 are controlled to pass though a carriage channel 70 which carries the printing papers to the image creation section 63 again.

The print control section 20 communicates with the MFP control section 14 for controlling the MFP and executes a control according the instruction. Furthermore, it issues commands to enable the entire MFP to smoothly operate in overall harmony, while managing the state of each section such as the scanner, laser exposure, image creation, fixing, sheet feeding/carriage and the like.

Next, an operation of a printer control section 20 will be described. An outlined operation of each section from a power source OFF state to an operation start enabled state will be described. First, when the power source is turned on, the print control section 20 issues commands to start a preparation operation to the scanner section 61, the laser exposure section 62, the image creation section 63, a fixing section 64, and the sheet feed/carrying section 65. Then, it waits for starting of communication with the MFP control section 14 which manages the entire MFP.

When communication with the MFP control section 14 is established, specifications are exchanged between the respective apparatus. Then, when a preparation operation of each part ends and an image forming operation is enabled, each part informs the MFP control section 14 that it is in an operation available state. The print control section 20 informs the MFP control section 14 of the apparatus state of each section. An example of that will be shown. First, the sheet feed/carrying section 65 detects the size of printing papers stored in the printing sheet stocker 68, the remaining amount (load) of printing papers stored in the printing sheet stocker 68, an operation state of the sheet feed/carrying section 65 (whether it is operative or having a failure) and informs of it. Next, the image creation section 63 informs of the amount of toner stocked in the toner container.

Next, an outlined operation of each section, from an operation instruction issued from the MFP control section 14 until a series of print operations are executed and end, in an operation start enabled state, will be described. First, the MFP control section 14 issues an operation starting command to the print control section 20. When the print control section 20 receives an operation start command, it directs the print operation start to the laser exposure section 62, the image creation section 63, the sheet feed/carrying section 65, and the fixing section 64.

The laser exposure section 62 starts rotation of a motor (polygon motor) for driving a polygon mirror 66. The image creation section 63 drives rotation of the photosensitive drum 67 and charges the photosensitive drum 67. The fixing section 64 turns on a fixing heater and increases it to a temperature which enables toner on the printing paper to be fixed on it. The sheet feed/carrying section 65 makes the driving means (motor) in a state in which it can carry. When each section of the device is prepared for operation, the print control section 20 informs the MFP control section 14 that preparation is complete.

When the MFP control section 14 receives the completion of preparation information from the print control section 20, it issues commands for the print operation on a per page basis. If it is a print job for 20 copies with 10 pages for each, for example, the MFP control section 14 issues print operation instructions for 200 pages. When the print control section 20 receives the print operation instruction, it issues a paper-feed instruction to the sheet feed/carrying section 65. If the printing papers can be fed, the sheet feed/carrying section 65 feeds and carries a sheet of the printing papers. Then, when the printing paper arrives at a predetermined place, it informs the print control section 20 that the printing paper arrived at the predetermined place.

In instances where printing papers cannot be fed such as where no printing paper is in the printing sheet stocker 68, it informs the print control section 20 that it cannot feed papers. The sheet feed/carrying section 65 has an overlap sending detection sensor which detects that printing papers are overlapped and carried on the carriage channel 70 (overlap sending state) or a thickness detecting sensor which detects the thickness of printing papers. When the sensors detect overlap sending or an abnormal state, the sheet feed/carrying section 65 interrupts a feeding operation and a carrying operation, and informs the print control section 20 of the abnormality.

In such a case, the print control section 20 informs the MFP control section 14 of the reason of the operation interruption, the place where a printing paper left in the apparatus and the like. When the printing paper is normally carried and arrives at the predetermined place, the print control section 20 directs the image creation section 63 to start image creation according to the predetermined place arrival information of the printing paper from the sheet feed/carrying section 65. By the timing control, a toner image is transferred on the printing paper. The fixing section 64 monitors the temperature of the fixing section 64 and controls it to be appropriate fixing temperature. If the printing paper deprives too much amount of heat from the fixing section 64, the temperature of the fixing section 64 may decrease. In such a case, the fixing section 64 informs the print control section 20 of decrease of the temperature of the fixing section 64, and in response to the information, the print control section 20 makes a carriage interval between the printing papers wider so that the fixing section 64 does not decrease the temperature any more.

If the temperature of the fixing section 64 still does not recover, it interrupts the operation. Then, after the temperature recovers, it controls to resume the operation. When all the printing papers have been discharged, the print control section 20 directs each section to stop the operation, and in response to the operation stop information from each section, it informs the MFP control section 14 that the operation ends.

Figure 7:
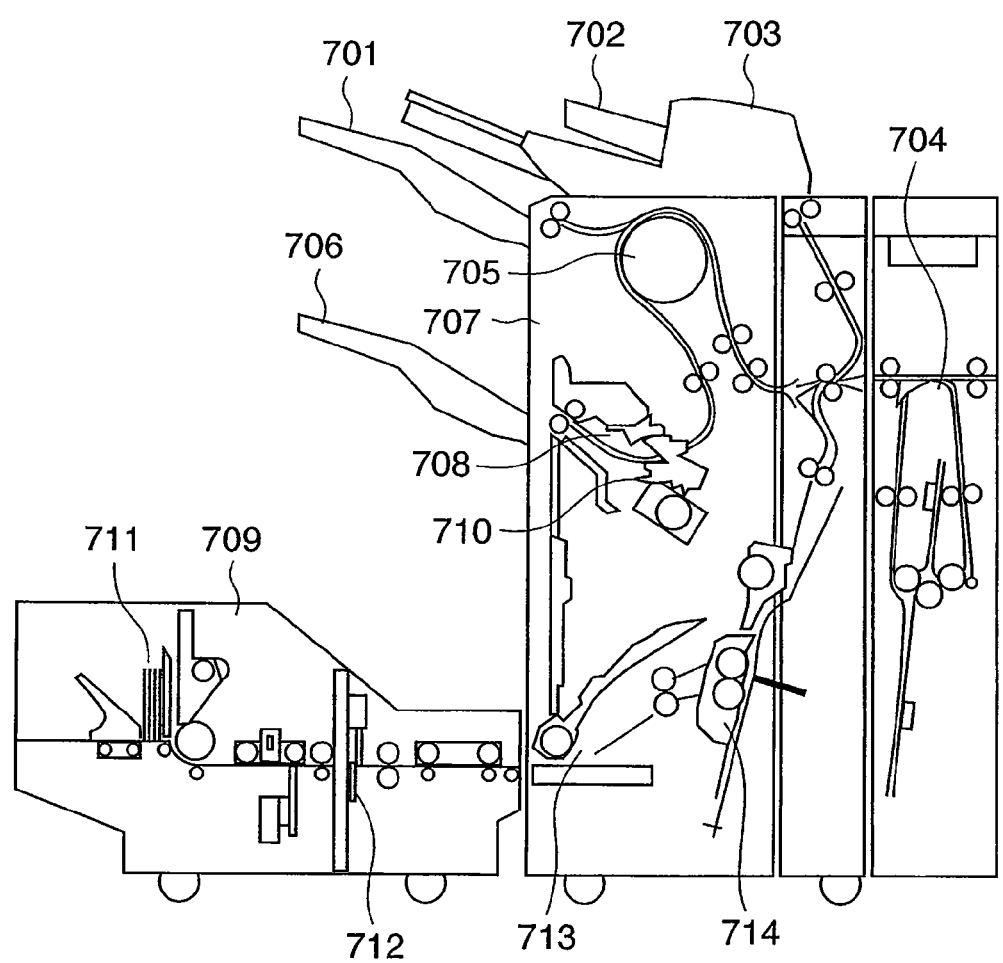
FIG. 7 is a cross sectional view for illustrating a post-processing section.

FIG. 7 is a cross sectional view for illustrating a configuration of an inline-finisher section.

If an inline-finisher section is connected, the printing papers discharged from the fixing section 64 of the printer section enter into the inline-finisher section. The inline-finisher section has a sample tray 701 and a stack tray 706. Printing papers are discharged by switching according to the kind of job or the number of printing papers to be discharged.

There are two types of sorting systems: Sorting can be performed by a bin sorting system with a plurality of bins for sorting papers into each bin and shift sorting system for shifting an electronic sorting function and a bin (or a tray) back and forth and sorting the printing papers to be outputted for each job. The electronic sorting function is called collating. If the electronic sorting function has a large capacity memory in a core section, it can also support an electronic sorting function by using a so-called collate function, which changes the order of pages buffered and the order of them to be discharged by using the buffer memory.

Next, a grouping function is a function for classifying for each page, while sorting sorts for each job. Further, if a stapling mode is set for the job to be outputted, it controls to discharge to a stack tray 706. At that time, the printing papers are accumulated in a processing tray in order inside the finisher for each job before the printing papers are discharged into the stack tray 706. Then, the printing papers are bound by a stapler 710 on the processing tray and discharged as a batch into the stack tray 706.

In addition, there are Z folding device 704 for folding a printing paper in a shape of Z and a puncher 705 for punching two (or three) holes for filing before reaching the abovementioned two trays and they perform respective processes according to the kind of job. For example, if a user sets a Z folding process via an operation section 13 as a setting relating to the process of the printing paper for the job to be outputted, it causes the Z folding device 704 to execute the folding process on the printing papers of the job. Then, it controls to pass through the apparatus and discharged to a discharging tray such as the stack tray 706 and the sample tray 701.

For example, if a user sets a punching process setting via the operation section 13 as a setting relating to a process of the printing paper on the job to be outputted, a punching process by the puncher 705 is executed on the printing papers of the job. Thereafter, it controls to pass through the apparatus and discharged to a discharging tray such as the stack tray 706 and the sample tray 701.

Further, the saddle stitcher 714 binds two places in the center part of the printing papers and causes a roller to clamp the center position of the printing papers, folds the printing papers half, and performs the process for creating a booklet like a pamphlet (bookbinding processing).

The printing papers bound by the saddle stitcher 714 are discharged in the booklet tray 713. Whether the processing operation on the printing papers such as a bookbinding process by the saddle stitcher 714 is enabled to be executed or not is also based on the setting of the process of printing papers set by a user for the job to be outputted as mentioned above.

An inserter 703 is for sending a printing paper set in the insert tray 702 to any of the discharging trays such as the stack tray 706, the sample tray 701 and the like without passing them through the printer. That enables the printing paper set in the inserter 703 to be inserted (inserted between) between the printing papers (the printing papers printed at the printer section) to be sent into the inline-finisher section and printing papers. It is assumed that the papers are set by a user in a face up state into the inserter tray 702 of the inserter 703 so that printing papers are to be fed from the top in order by a pick up roller.

Therefore, the printing papers from the inserter 703 are discharged in a face down state by being carried to the stack tray 706 or the sample tray 701 as they are. When the printing papers are sent to the saddle stitcher 714, the directions of their faces match as they are sent into the puncher side and then switched back and sent. Whether a processing operation of the printing papers such as inserting processing of or the like of the printing papers by the inserter 703 is enabled to be executed or not is based on the setting of a process of the printing papers set by a user on the job to be outputted as mentioned above.

Next, a trimmer 709 (cutting machine) will be described. The printing output made in a booklet (a saddle stitched slim book) by the saddle stitcher 714 is inputted into the trimmer 709. At that moment, first, the output of the booklet is fed out at a predetermined length by a roller and cut at the predetermined length by a cutter section 712, and the edges of a plurality of pages of the booklet are squared up. Then they are stored in the booklet hold section 711. Whether the process operation of the printing papers such as a cutting process by the trimmer 709 is enabled to be executed or not is based on the setting of the printing paper processing set by a user on the job to be outputted as mentioned above.

Figure 8:
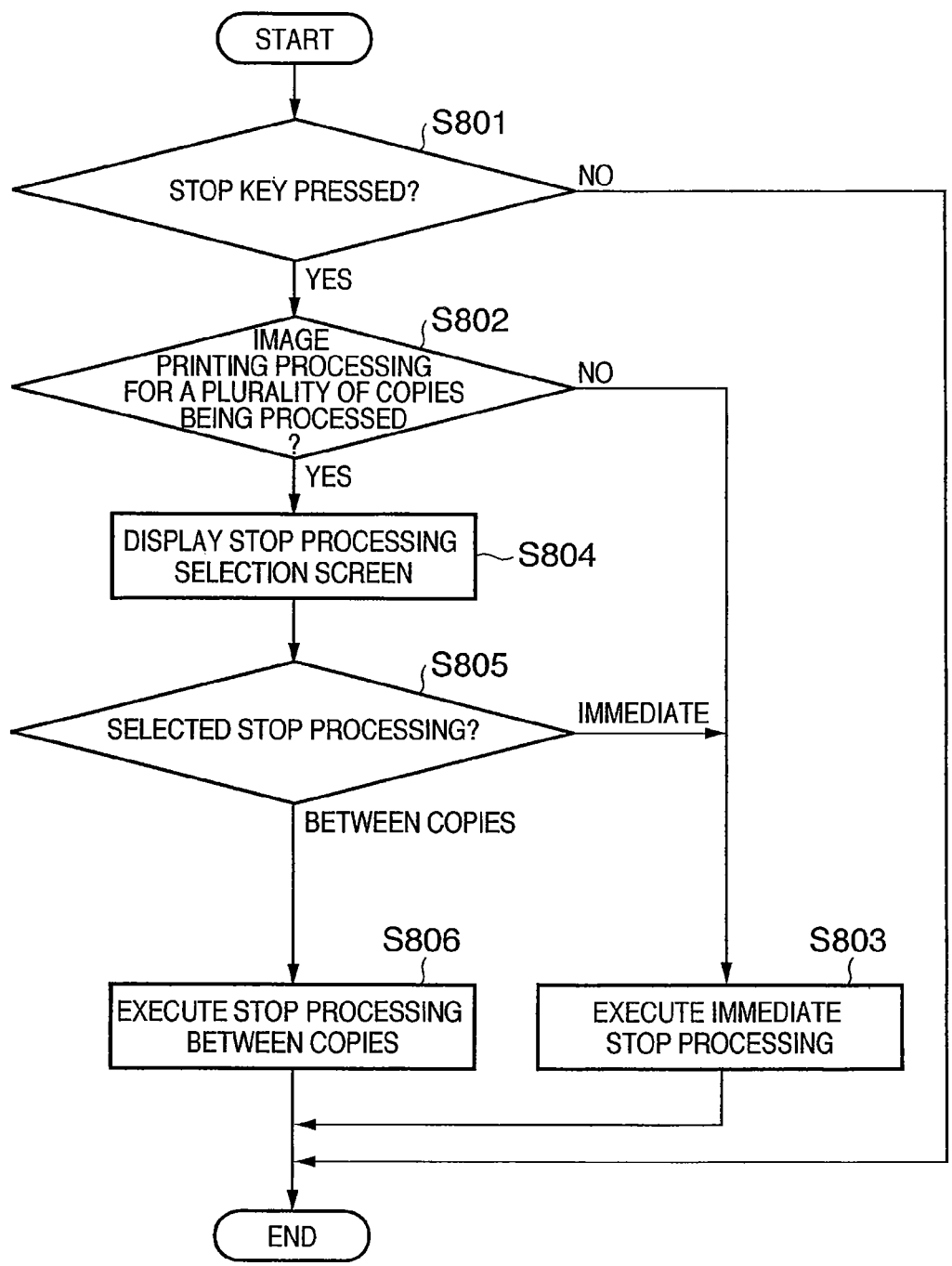
FIG. 8 is a flowchart for illustrating a first embodiment of the present invention.

Next, the operation featuring the present invention will be described in detail by using a flowchart in FIG. 8. First, the stop key 402 on the operation section 13 is pressed down by a user, while the abovementioned MFP is processing image forming such as a copying function, a network printing function and the like (S801). Here, if the MFP is processing a plurality of jobs, the corresponding job may be selected on a job status screen image 91 on the LCD shown in FIG. 9 and a stop key 92 may be pressed down instead of the stop key 402. Here, the job status screen image 91 is displayed as the system monitor key 518 is pressed down.

Next, whether the stopped job is image printing processing for a plurality of copies or not is determined (S802), and if it is not a job of a plurality of sections, immediate stop processing is executed (S803). The immediate stop processing is, for example, that an instruction of immediate stop processing is communicated from the operation section 13 to the MFP control section 14, where the instruction of immediate stop processing is communicated to the output job control section 23 and the output device management section 24. Then, the output job control section 23 and the output device management section 24 received the instruction perform processing to stop a printing job at timing as soon as possible on the job being executed. For example, in the output job control section 23, generation of image information of the next page is stopped. In the output device management section 24, an instruction is given to the printer control section 20 to stop feeding printing paper for the next page.

Figure 10:
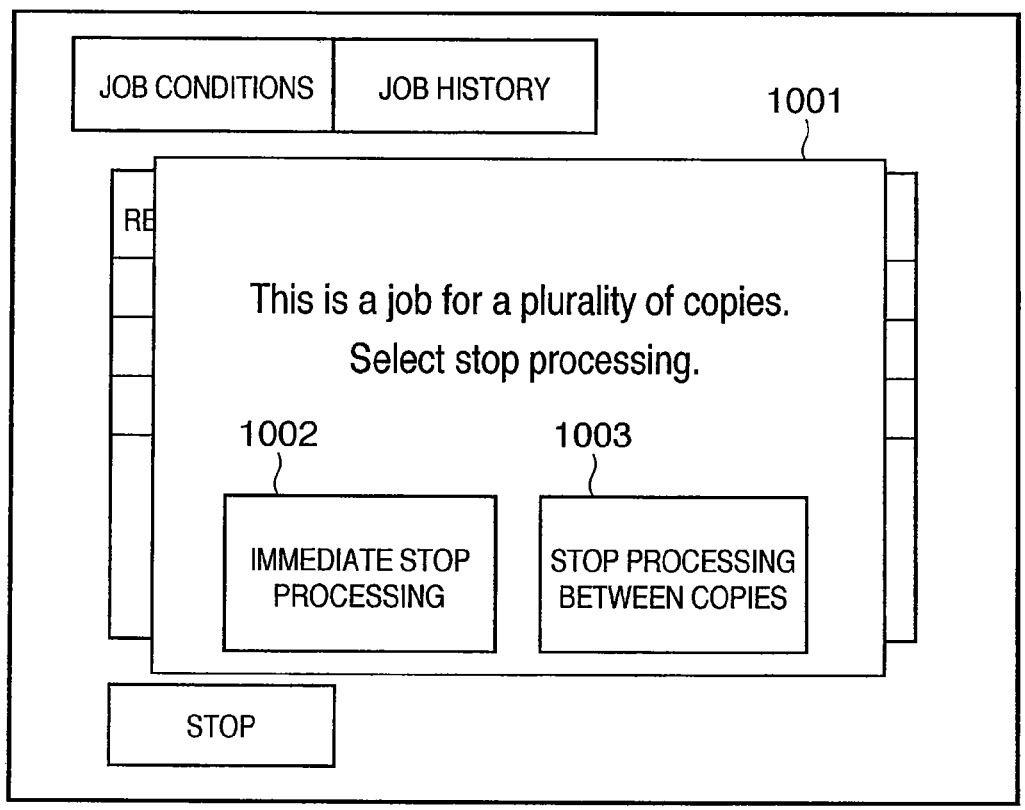
FIG. 10 is a diagram showing a user interface according to the first embodiment of the present invention.

On the other hand, if it is determined to be a printing job for a plurality of copies, stop processing selection screen image 1001 as shown in FIG. 10 is displayed (S804). By using an immediate stop processing key 1002 and stop processing between copies key 1003 provided on the stop processing selection screen image 1001, a user selects whether the stop processing of a printing job is performed either between copies or immediately (S805).

If the stop processing between copies key 1003 is selected, the MFP performs stop processing between copies on a printing job being executed (S806). The stop processing between copies is, for example, that an instruction of stop processing between copies is communicated from the operation section 13 to the MFP control section 14, where the instruction of stop processing between copies is communicated to the output job control section 23 and the output device management section 24. Upon receiving the instruction, the output job control section 23 and the output device management section 24 keep performing the processing on the printing job being executed until a boundary between copies is reached, and when the boundary between copies is reached, they stop the processing of the printing job.

For example, the output job control section 23 is directed to continue generating image information until a boundary between copies is reached, and when the boundary of copies is reached, to stop the generation. In the output device management section 24, operations of the printer control section 20 and the post-processing section 18 are controlled until the boundary between copies is reached to operate to complete the finishing processing such as stapling and the like. The operations ensure image forming to the end of the copy even if the stop key is pressed down at any point during image forming processing for a plurality of copies.

On the other hand, if the immediate stop processing key 1002 is selected, the MFP performs the immediate stop processing on the job being executed (S803). The processing is the same as that mentioned above. As such, in the case of the printing processing for a plurality of copies, a user can indicate a desired stop processing in an instruction of the stop processing during an image forming process, which can improve convenience of the user.

Second Embodiment

Figure 11:
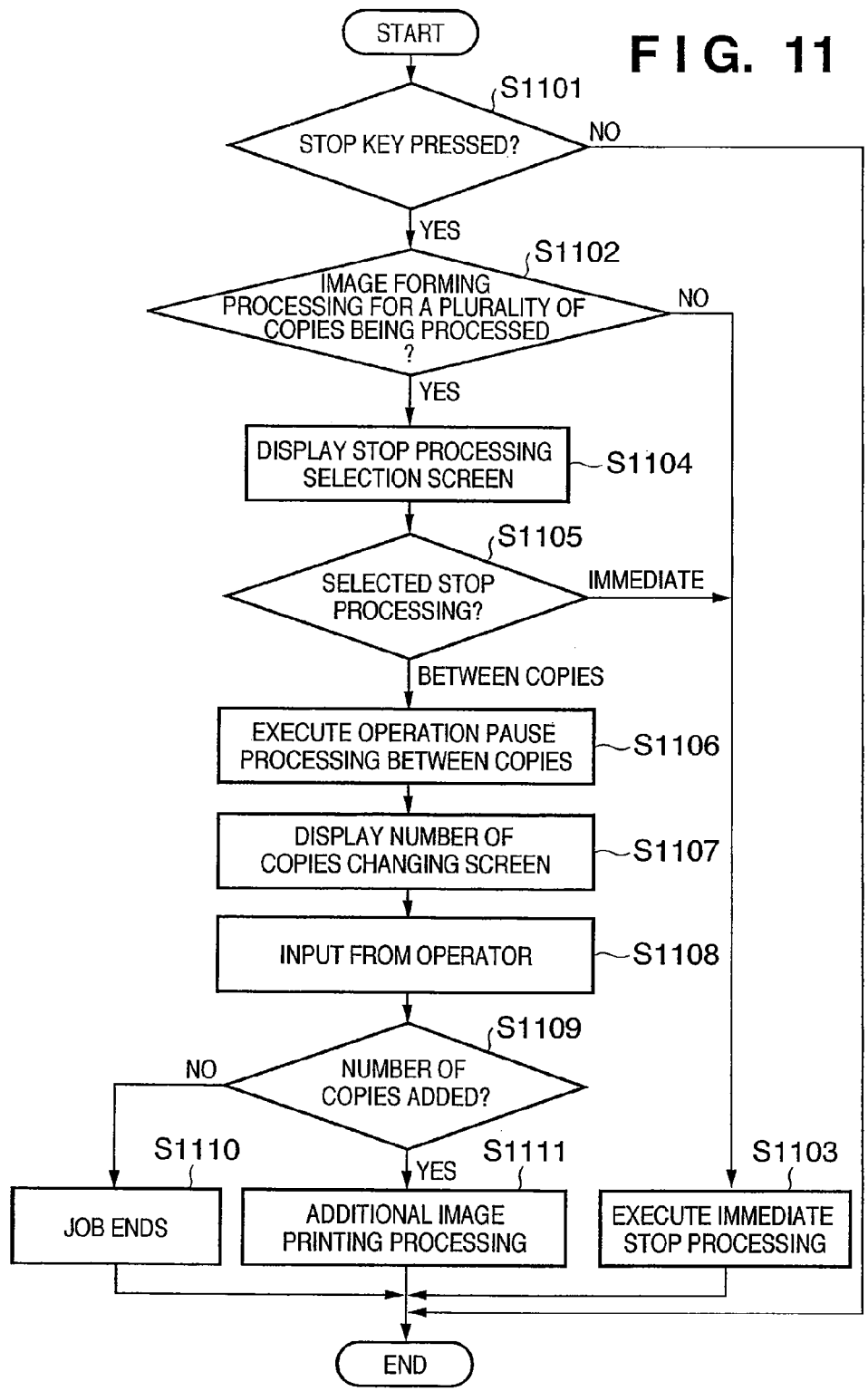
FIG. 11 is a flowchart for illustrating a second embodiment of the present invention.

Next, an operation of the second embodiment of the present invention will be described in detail by using the flowchart shown in FIG. 11. First, a user presses down the stop key 402 of the operation section 13, while the abovementioned MFP is processing image printing such as a copying function or a network printing function (S1101).

Figure 9:
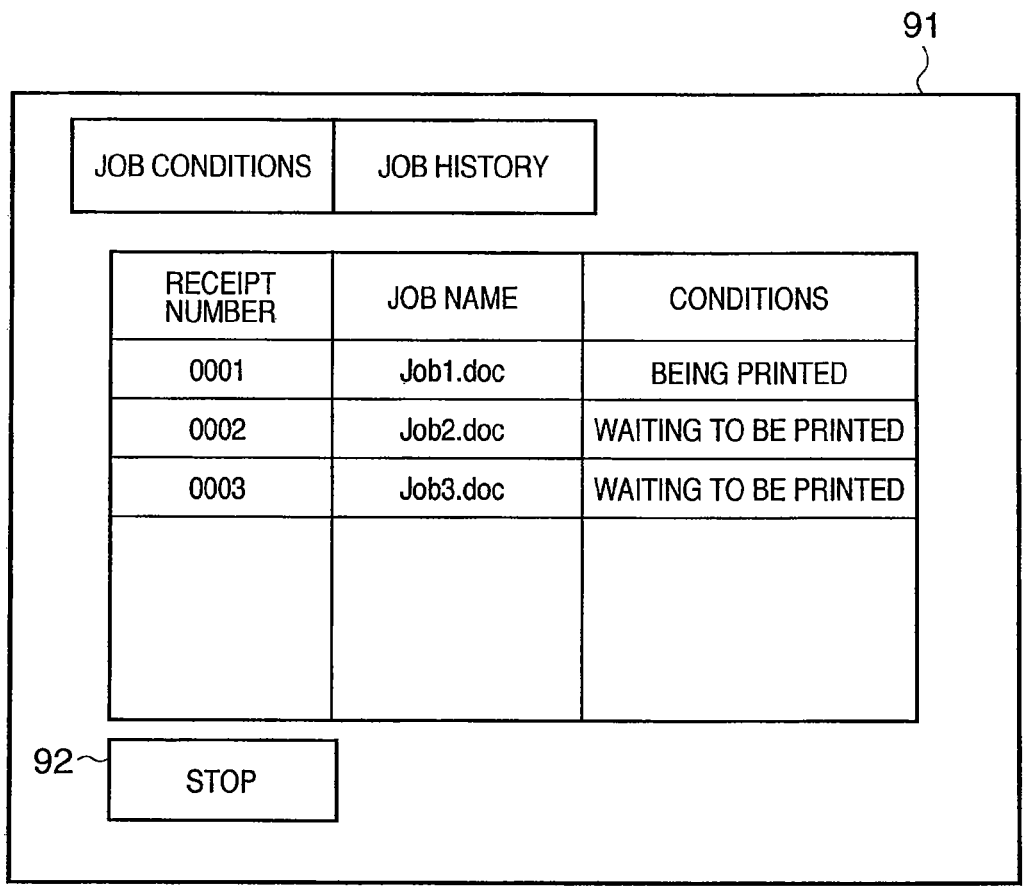
FIG. 9 is a diagram showing a user interface according to the first embodiment of the present invention.

Here, if the MFP is processing a plurality of jobs, the corresponding job may be selected on a job status screen image 91 on the LCD shown in FIG. 9 and a stop key may be pressed down instead of the stop key 402. Here, the job status screen image 91 is displayed as the system monitor key 518 is pressed down.

Next, whether the stopped printing job is image printing processing for a plurality of copies or not is determined (S1102), and if it is not a printing job for a plurality of copies, immediate stop processing is performed (S1103). The immediate stop processing is, for example, that an instruction of immediate stop processing is communicated from the operation section 13 to the MFP control section 14, where an instruction of immediate stop processing is communicated to the output job control section 23 and the output device management section 24.

The output job control section 23 and the output device management section 24 receive the instruction perform processing to stop a job as soon as possible on the printing job being executed. For example, in the output job control section 23, generation of image information of the next page is stopped. In the output device management section 24, an instruction is given to the printer control section 20 to stop feeding printing paper for the next page.

On the other hand, if it is determined to be a printing job for a plurality of copies, the stop processing selection screen image 1001 as shown in FIG. 10 is displayed (S1104).

By using the immediate stop processing key 1002 and the stop processing between copies key 1003 provided on the stop processing selection screen image 1001, a user selects whether the stop processing of a printing job is performed between copies or immediately (S1005).

If the stop processing between copies key 1003 is selected, the MFP executes a pause processing between copies on a printing job being executed (S1106). The pause processing between copies is, for example, that the MFP control section 14 communicates an instruction of a pause processing between copies to the output job control section 23 and the output device management section 24. Upon receiving the instruction, the output job control section 23 and the output device management section 24 continue performing the printing processing on the printing processing being executed until a boundary between copies is reached, and when the boundary between copies is reached, pause the processing of the printing job.

For example, the output job control section 23 is controlled to continue generation of image information until a boundary between copies is reached, and when the boundary of copies is reached, pauses the generation. In the output device management section 24, operations of the printer control section 20 and the post-processing section 18 are controlled until the boundary between copies is reached to operate them to complete a finishing process such as stapling and the like.

Figure 12:
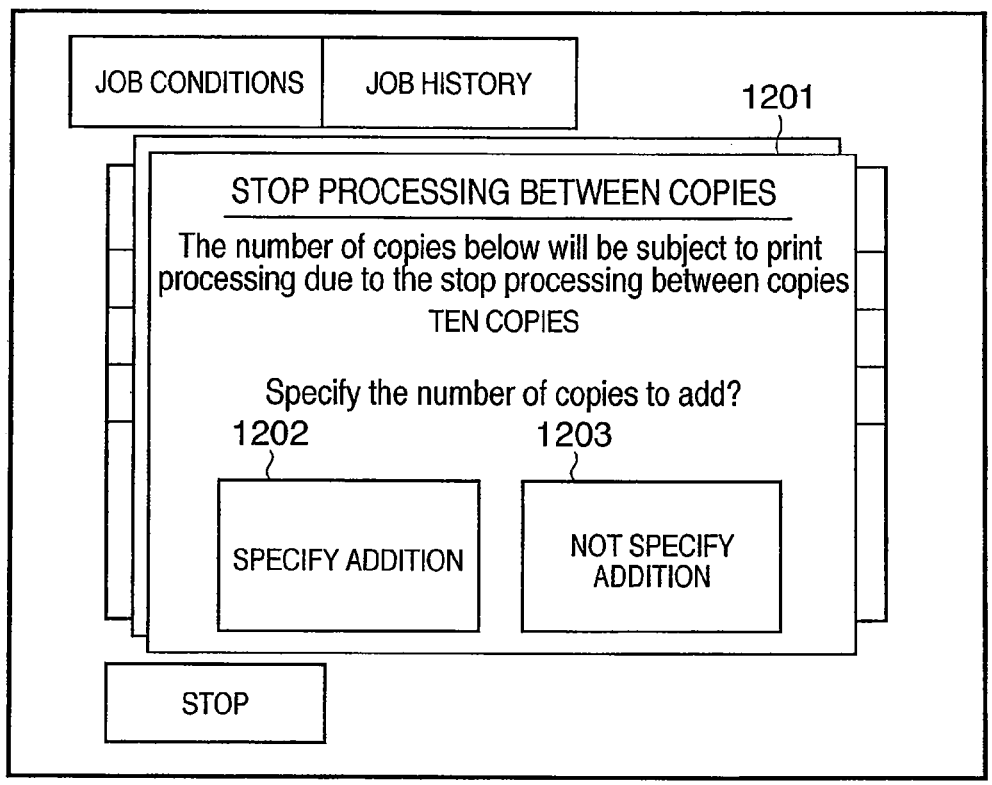
FIG. 12 is a diagram showing a user interface according to the second embodiment of the present invention.

On the other hand, after a user selects the stop processing between copies, the LCD displays a change number of copies screen image 1201 as shown in FIG. 12 (S1107). The change number of copies screen image 1201 may be displayed in parallel with execution of a pause processing performed in step S1106.

On the change number of copies screen image 1201, the number of copies to be outputted in consideration of the stop processing between copies is displayed. If the user views the number of copies and wants to stop the processing without adding the number of copies, the user presses down a non-additional instruction key 1203. Otherwise, if the user wants to increase the number of outputted copies, the user presses down an additional instruction key 1202.

Figure 13:
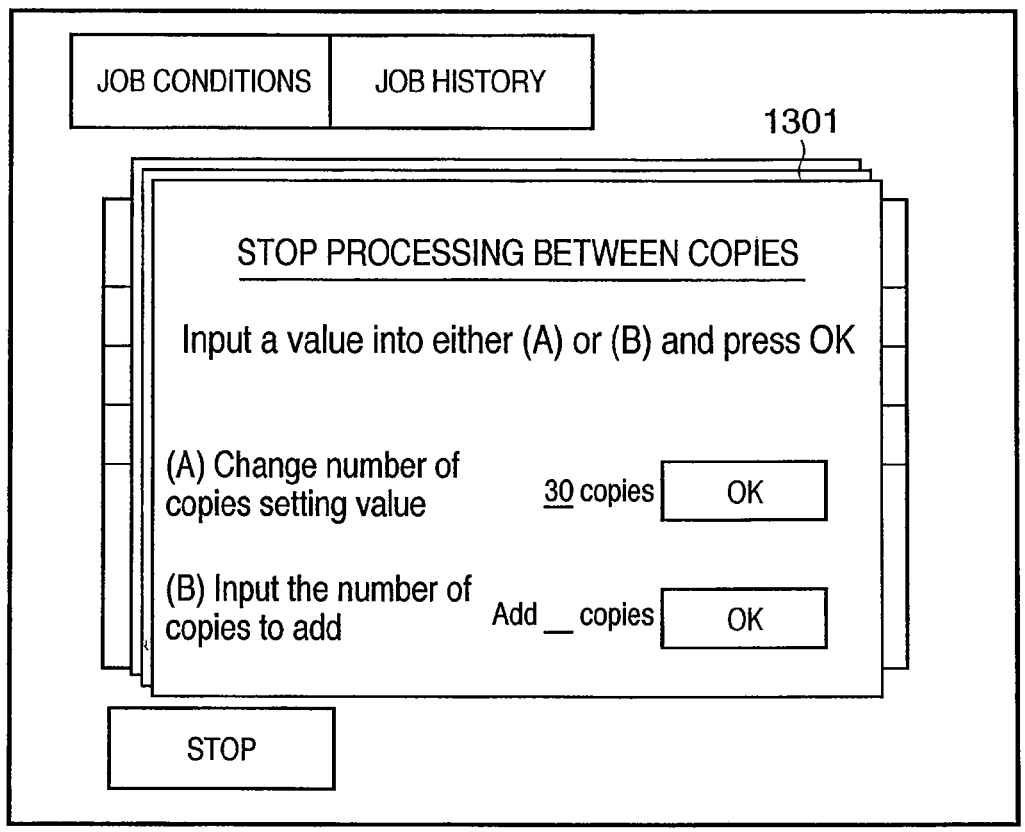
FIG. 13 is a diagram showing a user interface according to the second embodiment of the present invention.

In such a case, a number of copies specification screen image 1301 as shown in FIG. 13 is displayed. On the screen, the number of printing copies previously set when the printing job was inputted is displayed as shown by (A). Therefore, the number of outputted printing copies can be changed as a user sets the value of the number of copies again. Alternatively, the number of printing copies to be added can be specified for the number of printing copies to be outputted in consideration of stop processing between copies as shown by (B) (S1108).

When an input from the user ends, the inputted value is determined (S1109), and the process according to that is performed. For example, at the step S1108, if it is no additional number of copies, the MFP which was in a pause state at the step S1106 performs stop processing of the printing job, and the operation ends (S1110). If, on the other hand, at the step S1108, an additional number of copies specification is done, the MFP which was in the pause state at the step S1106 resumes the image forming processing for the specified number of copies and the printing job ends thereafter (S1111).

As such, in the stop processing instruction during image printing processing for printing processing for a plurality of copies, stop processing desired by the user can be directed. Additionally, with means for setting increase and decrease of the number of printing copies, convenience of a user can be further improved.

As such, in the stop processing instruction during image printing processing for printing processing for a plurality of copies, stop processing desired by the user can be directed. Additionally, with means for setting increase and decrease of the number of printing copies, convenience of a user can be further improved.

An example of a configuration encompassed in the embodiment will be enumerated. For example, it is assumed to be a printing apparatus in which document data to be printed can be received from an external information processing apparatus such as a host computer or the like and document data from a document reading means such as a reader section or the like can be accepted as in the embodiment. If it is a printing apparatus in a so-called complex function type, a plurality of kinds of jobs to be enumerated below, for example, will be an object of various kinds of control relating to the abovementioned stop processing of printing.

(1. A Print Job from Outside)

For example, a print job whose printing data is issued from a peripheral device such as a job accepted from a peripheral device or the like is made an object of various kinds of control relating to the abovementioned stop processing of printing. For example, if a print job is to be printed from a host computer, it is adapted to be able to accept a print request by the method below.

For example, under the control of the CPU of the host computer, a request for starting printing of a job to be printed is accepted by an instruction from the user of the host computer via a printer driver of the printing apparatus to be displayed on a display section of the host computer. As such, the request for starting printing of a print job from outside is controlled by a user of the peripheral device via a user interface unit of the peripheral device. Then, according to the instruction to start printing processing of the host computer, data on a printing job to be printed is sent from the host computer to the printing apparatus via a network.

Associated with data on a job sent from the host computer, image data of a document to be printed on a printing paper and printing condition data of the data are sent. The printing condition data includes various printing processing condition parameters for defining a number of printing copies, a setting whether it is single-sided printing or double-sided printing, a setting of layout printing, a finishing setting such as stapling or the like, and the like. When the printing apparatus receives data of a print job from the host computer, the control section of the printing apparatus causes the printing apparatus to execute printing processing of the printing data of the print job according to the printing condition data of the job.

(2. A Print Job for Generating Image Data to be Printed by the Printing Apparatus)

For example, a print job whose image data is issued from the device such as a job read by a document reading section is also made an object of various kinds of control relating to the abovementioned stop processing of printing. For example, if a print job for which document image data is read by a document reading unit included in the printing apparatus is to be printed, it is adapted to be able to accept a print request by the method below.

For example, a request for starting printing of a print job read by the reader section is controlled by a user of a printing apparatus via a user interface unit of the printing apparatus. The operation section or the display section included in the operation section, for example, corresponds to a user interface unit of the printing apparatus itself.

At this moment, for example, under the control of the print control section 20 included in the printing apparatus, a request for starting printing of a print job to be printed is made able to be accepted by an instruction from the user of the printing apparatus from the operation section of the printing apparatus. In addition, various kinds of a series of printing processing condition data of a job to be printed such as mentioned above is controlled to be able to be accepted from a user of the printing apparatus via a print setting screen image to be displayed on the display section of the operation section of the printing apparatus. As the request for starting printing the print job is accepted from a user via the operation section of the printing apparatus, the print control section 20 causes the printing apparatus to print the print job according to the printing condition data of the print job.

As in the embodiment, if the printing apparatus is adapted to include a memory unit such as a hard disk and the like, it is preferable that it be adapted as below. For example, image data of the job such as a print job from a reader section and a print job from a peripheral device is adapted to be able to be stored in the hard disk included by the printing apparatus in the embodiment. Then, image data to be printed is read out from the hard disk, and controlled to be able to be printed.

As such, the printing apparatus preferably includes a storage section with a degree of memory capacity such as a hard disk or the like which can store data of a plurality of print jobs each of which consists of a plurality of pages of document data. With such a configuration, the following kinds of jobs can also be controlled.

(3. A Print Job from a Box Function)

The box function is to make data of a job from the reader section and data of a job from a peripheral device able to be saved in a box region of a storage section such as a hard disk or the like included in the printing apparatus, in response to an instruction form a user. In addition, according to an instruction from a user inputted via the user interface section of the printing apparatus after image data has been stored in the box region, various kinds of manipulation of data stored in the box is enabled. For example, data output such as printing, sending or the like is enabled on schedules desired by a user and in a printing styles desired by a user at any number of times via a user interface section of the printing apparatus after the document has been stored in the box. Even a print job using such a box function is subject to various kinds of control relating to stop processing of the printing mentioned above.

As mentioned above, the print stop control is adapted to be enabled on such a plurality of kinds of jobs of functions different from each other (a plurality of kinds of jobs whose data input channels are different from one another). That can further improve advantages of the embodiment.

In the embodiment, a configuration for controlling a request for stopping a printing operation of a print job to be printed to be able to be accepted by a user of the printing apparatus applied with the embodiment via a user interface unit (an operation section or a display section) included in the printing apparatus applied with the embodiment has been mainly described. With the configuration below on the assumption of the abovementioned configuration, the advantages of the embodiment can be further improved.

For example, a request for stopping printing of a job to stop its printing processing is controlled to be able to be accepted by a user of a peripheral device via the user interface section of the peripheral device. An example of that will be described below.

For example, under the control of the CPU of the host computer, a list regarding a plurality of print jobs inputted into the printing apparatus such as a user interface screen image of FIG. 9, for example, is displayed on the display section of the computer. Then, it is controlled to let a user of the host computer select the print job which the user wants to stop via a list. Further, a user interface screen image to enable functions equivalent to the functions which can be provided by the user interface screen image of FIG. 10 or the user interface screen image of FIG. 12 or the user interface screen image of FIG. 13 is controlled to be able to be displayed on the display section of the host computer. Then, various desired requests for stopping are enabled to be accepted from the user of the host computer via a user interface section of the host computer.

A display, a keyboard, a mouse or the like corresponds to the user interface section of the host computer. As the user of the host computer accepts the request for stopping printing via the user interface section of the host computer, the instruction is controlled to be sent from the host computer to the printing apparatus by the CPU of the host computer. Under such a configuration, the abovementioned processing of various flowcharts is controlled to be executed by the control section of the printing apparatus. Accordingly, the print stop request desired by the user of the host computer is controlled to be enabled by the printing apparatus from a remote peripheral device such as the host computer or the like.

As mentioned above, various kinds of print stop control processing which can be provided at the printing apparatus side in the embodiment are adapted to be enabled for remote control even from a peripheral device such as a computer or the like distant from the printing apparatus of the embodiment. That can further improve the advantages of the embodiment.

If a print stop control processing of the print job to be printed is executed from a remote peripheral device like this, the jobs treated as objects of control may be adapted to be able to be arbitrary specified from all kinds of print jobs received by the printing apparatus as mentioned above. Alternatively, it may be adapted to permit execution of a stop control provided by the embodiment with only the print job accepted from the peripheral device being a job which is an object of the stop control. As such, it may have any configuration. In order to take full advantage of the embodiment, it is necessary to adapt it to enable control below.

For example, only the print job for which a setting of a predetermined type of sheet processing relating to finishing is indicated by the user is forbidden to execute control such as to permit to execute the abovementioned print stop control. As an example of the print job for which such a predetermined kind of printing paper setting is performed, a job below is present. For example, it is a print job for which stapling processing is to be executed by the post-processing section 18 (also referred to as a finisher) of the system on the printing paper printed at the printer section 17.

For example, it is a print job for which punching processing (punching processing) is to be executed by the post-processing section 18 on the printing paper from the printer section. Alternatively, for example, it is a print job or the like for which bookbinding processing of the printing paper from the printer section 17 to be executed by the post-processing section 18. As such, it is a job for which the total of original document pages included in the job to be processed is a plurality of pages and which needs to bind a plurality of printed papers for the plurality of pages by the unit of one copy.

As such, it is a matter of course that the embodiment is adapted to enable the print stop control of the embodiment for the print job that needs a predetermined kind of sheet processing to execute by the post-processing section 18 included by the system.

The embodiment, however, is adapted to enable the various kinds of print stop control even on a print job to which they do not correspond, and in a kind different from a print job for which a predetermined kind of finishing processing needs to be executed as such.

An example of the print job which is an object of the control will be enumerated. For example, a non-staple printing job does not cause the post-processing section 18 to execute the staple processing on a printing paper from the printer section 17 falls into this category. For example, a non-punch printing job does not cause the punching processing to be executed. For example, a non-bookbinding printing job does not cause the bookbinding processing to be executed falls into this category. It is a matter of course that a non-sort job corresponding to a kind of job does not cause any sorting processing (classifying process of sheet) to be executed falls into this category.

Even if such a type of print job is to be stopped printing, user's needs assumed in the prior art may be involved. Therefore, the print control section 20 of the printing apparatus permits execution of the various kinds of print stop control on the print job for which a predetermined kind of finishing processing needs not to be performed instead of forbidding executing them. In other words, the print control section 20 controls a process relating to the various kinds of print stop control to be enabled on the print job for which a predetermined kind of finishing processing needs not to be executed in response to a request from a user.

The print control section 20 controls the print stop control according to a request from a user who calls for a print stop request without regard for whether the print job which is an object of the print stop is a print job requiring a predetermined kind of finishing processing or not.

With such a configuration, it can prevent a malfunction such as being unable to address a problem occurring that has been assumed in the prior art. In addition, it produces an effect such as enabling an effect of the embodiment to be produced for certain.

If any job which can be dealt with by a printing apparatus to which the embodiment is applied is adapted to enable the stop control and may cause deteriorating operability, the embodiment may be adapted as below.

For example, as a condition of a job to execute the control, the total number of the document pages of the document data to be printed of the job to be printed is a plurality of pages without regard to whether it is a print job which requires the predetermined kind of finishing processing. In addition, a condition of the print job is that it is a print job for which the number of printing copies is a plurality of copies. If a user issues a request for stopping printing on the print job which matches the condition, the print control section 20 of the embodiment controls as below. An example of a job which matches the condition, for example, is a job or the like for printing a series of pieces of document data consisting of five pages in total of document data by ten copies in the non-stapling mode.

In such a case, the print control section 20 permits the presentation of the plurality of kinds of print stop processing methods which are enabled in a printing system to which the embodiment is applied to a user via the user interface unit of the embodiment, for example. In addition, the user controls to select a desired print stop processing method from a plurality of kinds of print stop processing methods. Furthermore, a printing apparatus to which the embodiment applies so as to stop printing of the print job by the print stop processing method selected by the user is adapted to be able to be controlled.

On the other hand, if the print job for which a print stop request is issued by a user is the non-plurality of copies print job whose number of printing copies is a copy, for example, the control section controls as below: It forbids presenting the plurality of kinds of print stop processing methods which are enabled in a printing system to which the embodiment applies to the user via the user interface unit of the embodiment. It forbids enabling a user to select a desired print stop processing method from a plurality of kinds of print stop processing methods. It configures the printing apparatus to which the embodiment applies to be able to be controlled to automatically stop printing of the print job by a predetermined kind of print stop processing method without letting a user execute selection of the print stop processing.

For example, the immediate stop processing at the step S803 is executed. The immediate stop processing described in the embodiment includes any of the processes below, at a minimum. For example, if the print job for which a request for stopping is issued is currently being printed and also printing for a page is being executed on a surface of a printing paper, printing of only the page currently being printed is to be completed. At the point when printing of the page has been completed, printing of the job is immediately stopped. Alternatively, if printing for a page has not been completed, i.e., if a white space occurs, printing of the job may be forcibly and immediately stopped.

The series of control examples is a selective control based on whether the job is a job for a plurality of copies or not without regard of whether the print job for which a user issued a request for stopping printing is a job requiring a predetermined kind of finishing or not.

In other words, for example, it is control which enables the print job to execute a predetermined kind of sheet processing by a post-processing section included in the system including at least any of stapling, punching, bookbinding, folding, gluing and cutting. In addition, it is control which enables the print job which does not need the post-processing section to execute such a predetermined kind of sheet processing.

To describe the control of the embodiment further in other words, it controls the printing apparatus of the embodiment as below.

For example, it is assumed that the print job which is an object of a print stop specified by a print stop request from a user inputted via the user interface unit of the embodiment is already being printed at the moment when the user inputs the request. In addition, it is assumed that the print job for which a user issues a print stop request is the print job which requires printing processing for a plurality of copies. In such a case, the control section of the printing apparatus of the embodiment controls as below whether the print job is a job requiring execution of the predetermined kind of sheet processing by the post-processing section or a job which does not need to execute a predetermined kind of sheet processing.

For example, it presents a plurality of kinds of print stop processing methods which can be executed in the printing apparatus to a user who issued the print stop request via the user interface unit of the embodiment. An example of the user interface control is adapted to cause the display section to display various user interface screen images of FIG. 10, FIG. 12 or FIG. 13 as mentioned above. In addition, it enables selecting a print stop processing method desired by a user from a plurality of selecting candidates corresponding to the plurality of kinds of print stop methods. Then, in response to selection of a desired candidate by a user, it enables a print stop processing of the print job for which a stop request is issued by the kind of the print stop processing method selected by the user.

On the other hand, it is assumed that the print job which is an object of the print stop specified by the print stop request from a user inputted via the user interface unit of the embodiment is currently being printed at a moment when the request is inputted by the user. In addition, it is assumed that the job for which the print stop request is issued by the user is the print job which does not execute the printing processing for a plurality of copies. For example, the print job or the like whose number of printing copies is only one corresponds to that as the print job whose number of printing copies is a predetermined number of copies. In this case, the control section of the printing apparatus of the embodiment controls as below even if the print job is a print job which requires executing the predetermined kind of sheet processing by the post-processing section or even if it is the print job which does not need to execute predetermined kind of sheet processing.

For example, it is forbidden to present the plurality of kinds of print stop processing methods to a user via the user interface unit of the embodiment. It is controlled to enable the print stop processing of the print job for which a stop request is automatically issued by a predetermined kind of print stop processing method without requiring the user to select a print stop processing method from the plurality of kinds of print stop processing methods.

If the control section of the printing apparatus of the embodiment performs determination on how much printing copies is to be stopped and determination on whether the print job is a job needing printing for a plurality of copies, it is controlled as below. For example, a user executes the determination by reading out from memory and referencing print condition data set by the user via the user interface section of the embodiment for the job before starting the printing.

To stop printing at a boundary between copies means an operation as below. For example, it is assumed that a job for which document data consisting of three pages is to be printed single-sided for four copies is accepted. In other words, the job is for creating four sets in total of three printing papers each of which printing is performed for each page of the three pages. Then, it is assumed that the print stop request of the job is inputted by a user via a user interface section. It is assumed that the first copy of the job has been printed at the printer section 17 at a moment when the request is inputted, and printing of the second page of the second copy of the job is currently being executed. In this case, it is assumed that processing to stop printing at a boundary between copies is executed. In other words, it is assumed that a user requests the stop processing between copies via the user interface of the embodiment. In such a case, the control section 20 causes the printing apparatus to which the embodiment applies to execute a series of processes as below for the job.

For example, the print control section 20 causes the printer section 17 to execute printing of the second page of the second copy being executed by the printer section 17 at the time when the print stop request is issued. In addition, it also causes the printer section 17 to execute printing of the third page of the second copy. When the printing of the third page of the second copy has been completed by the printer section 17, the printing of the job is stopped. In other words, it does not cause the printing of the first to the third pages of the third copy of the job and the printing of the first to the third pages of the fourth copy of the job to be executed.

Such a series of processes correspond to the processing for stopping the printing at a boundary between copies. In this case, it is assumed that immediate print stop processing is to be executed. In other words, it is assumed that the immediate stop processing is requested by the user via the user interface of the embodiment. In such a case, the control section 20 causes the printing apparatus applied with the embodiment to execute the series of processing as below for the job.

For example, the control section 20 causes the printer section 17 to execute printing of the second page of the second copy being printed by the printer section 17 at a moment when the print stop request is performed. It stops the printing of the job when the printing of the second page of the second copy has been completed at the printer section 17. Whether all the printing of the second page of the second copy is to be completed or outputted as a blank paper at a midway stage at this moment is previously defined. It controls to forbid at least all of execution of printing of the third page of the second copy of the job, execution of printing of the first to the third pages of the third copy and execution of printing of the first to the third pages of the fourth copy. Such a series of processes correspond to the immediate print stop processing.

As a method of stopping printing at a boundary between copies, there is a method of stopping the printing at a boundary between copies to which the page currently being printed has attributes as mentioned above. Aside from this approach, the method given below is also available.

For example, it enables the user who issued the print stop request to decide how many copies needs to be printed before stopping the printing as in the user interface of FIG. 13. In addition, a method of stopping the printing of the job at a moment when the printing for the number of copies specified by the user finishes according to the instruction inputted via the user interface can be considered. This method enables the print control section 20 to control to cause the printer printing apparatus to execute the operation below in the abovementioned case.

For example, it is assumed that a user requests an instruction for stopping the job at a moment when the job has been printed for three copies. In such a case, for example, the print control section 20 causes the printer section 17 to execute the second page of the second copy being printed at the printer section 17 at a moment when the print stop request is issued. In addition, it also causes the printer section 17 to execute the printing of the third page of the second copy. Further, it causes the printing of the first to the third pages of the third copy of the job to be all completed. When the printing of the third page of the third copy is completed at the printer section 17, the printing of the job is stopped. In other words, it does not cause the printing of the first to the third pages of the fourth copy of the job to be executed.

It controls to execute such a series of processes in response to a request from a user who issued the print stop request independent of the above methods as a method of at least two kinds of stop processing methods corresponding to a method of stopping printing at a boundary between copies.

Such various kinds of controls are adapted to be enabled by the embodiment. In other words, the control below is adapted to be enabled.

For example, the control section applied with the embodiment can make respective kinds of control as enumerated below enabled as a job processing method in a printing system which has a printing apparatus applied with the embodiment which can accept a plurality of kinds of print jobs.

For example, it controls a print stop request of the print job to be printed by the printing apparatus to which the embodiment applies to be acceptable from the user via the user interface section. In addition, it is assumed that the print job which is an object of the print stop is the print job which needs to print a plurality of copies. In such a case, it can control the print stop processing of the print job to be enabled by the printing apparatus to which the embodiment applies in a print stop processing method based on a request from a user inputted via the user interface section in a plurality of kinds of print stop processing methods which is enabled by the printing apparatus to which the embodiment applies.

In addition, if the print job to be stopped printing is a print job for which a plurality of copies need not be printed, the print stop processing of the print job is enabled by the printing apparatus to which the embodiment applies in a predetermined print stop processing method in the plurality of kinds of printing processing methods without requiring a user to select the print stop processing method with the user interface section.

If the print job which is an object of the print stop is the print job which executes printing of a plurality of copies, the job may be a print job which requires a predetermined kind of sheet processing by the predetermined post-processing section or a print job which does not need a predetermined kind of sheet processing. In either case, it can control the print stop processing of the print job to be enabled by the printing apparatus to which the embodiment applies in a print stop processing method based on a request from a user inputted via the user interface section in a plurality of kinds of print stop processing methods which is enabled by the printing apparatus applied with the embodiment.

In addition, if the print job which is an object of the print stop is a print job which does not need printing of a plurality of copies, the job may be a print job which requires the predetermined kind of sheet processing or a print job which does not need the predetermined kind of sheet processing. In either case, it can control the print stop processing of the print job to be enabled by the printing apparatus applied with the embodiment in a predetermined print stop processing method in the plurality of kinds of printing processing methods without requiring a user to select the print stop processing method by the user interface section.

The predetermined print stop processing method is, for example, the immediate print stop processing. The predetermined kind of sheet processing is at least any of sheet processing which is enabled by the post-processing section included by the system of the embodiment including at least any of stapling, punching, bookbinding, folding, gluing and cutting.

With the configuration above, it can produce advantages of the embodiment without causing a new problem such as being unable to maintain the high operability which can be originally provided by the embodiment. In other words, the concerns assumed above are eliminated. For example, they are the concerns when a configuration is assumed that any type of job unequivocally displays various user interfaces as shown above and the user who issued the stop request is unequivocally allowed to select the stop processing to be executed from a plurality of kinds of stop processing. Such a configuration always requires a selecting operation from a user who performs the print stop request. As such, it can prevent new problems from occurring, such as being unable to maintain the high operability which the embodiment can originally provide, or the like.

All those regarding the print stop control described in the embodiment including the first and the second embodiments detailed above, or a part of processing or controlling is adapted to be able to be combined as required unless that causes no contradiction. In other words, it may be changed, applied or developed into any configuration if only it is in a specification which provides advantages which can be provided by the embodiment can be produced as much as possible. As mentioned above, the role of the print control section 20 can be executed by the MFP control section 14.

Examples of each type of the embodiments of the present invention have been detailed above. The present invention, however, can take an embodiment as a system, a device, a method, a program or a storage medium (recording medium) and the like. Specifically, it may be applied to a system consisting of a plurality of apparatuses or may be applied to a device consisting of a single apparatus.

The present invention may supply a software program (a program corresponding to a flowchart shown in the figures in the embodiment), which implements the functions of the foregoing embodiments, directly or remotely, to a system or an apparatus. In implementing the present invention, a case is included where it is also achieved by the system or a computer of the apparatus to read out and execute the supplied program codes.

Therefore, in order to implement the function processing of the present invention by a computer, the program code to be installed into the computer also implements the present invention. That is to say, the present invention also includes a computer program for implementing function processing of the present invention. In such a case, if only the functions of the program are included, it may be in any form of an object code, a program which is executed by an interpreter, script data supplied to an OS and the like.

As storage media for supplying the program are a floppy disk, a hard disk drive, an optical disk, a magneto-optical disk, an MO, a CD-ROM, a CD-R, a CD-RW, a magnetic tape, a non-volatile type memory card, a ROM, a DVD (DVD-ROM and a DVD-R) and the like.

In addition, as for the method of supplying the program, a client computer can be connected to a homepage on the Internet using a browser of itself, and the computer program of the present invention or a compressed file including an automatically-installable function can be downloaded to a recording medium such as a hard disk drive to supply the program. Further, it can be implemented as the program code constituting the program is divided into a plurality of files and the respective files are downloaded from different homepages. In other words, a WWW server that downloads, to multiple users, the program files that implement the function processing of the present invention by computer is also encompassed in the present invention.

It is also possible to encrypt and store the program of the present invention on a storage medium such as a CD-ROM and distribute the storage medium to users. In such a case, users who meet certain requirements can be allowed to download key information for decrypting the encryption from a homepage via the Internet, and to execute the encrypted program by using the key information and install the program in the computer to realize it.

Furthermore, the aforesaid functions of the embodiments are implemented as a computer executes the installed (loaded) program. An OS or the like running on the computer may perform a part or all of the actual processing based on an instruction from the program so that the functions of the foregoing embodiments can be implemented by this processing. Furthermore, the program read from the storage medium may be written to a function expansion board inserted into the computer or to a memory module provided in a function expansion unit connected to the computer. In such a case, a CPU or the like mounted on the function expansion board or function expansion unit performs a part or all of the actual processing based on an instruction from the program thereafter so that the functions of the foregoing embodiments can also be implemented by this processing.

A specific example of each of the points is like what described relating to the printer driver of the host computer.

With the configuration such as the abovementioned embodiments, it can address conventionally assumed conditions, for example. In addition, it can flexibly address various needs from various users relating to the print stop request of the print job by taking account of utilizing environment and the like of the apparatus. Therefore, a usable and convenient printing environment can be constructed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-291765, filed Oct. 4, 2005, which is hereby incorporated by reference herein in its entirety.

What is claimed is:
1. A printing apparatus comprising:
a printing unit configured to execute a print job, wherein the print job is for printing a plurality of copies of a plurality of pages;

an accepting unit configured to accept a stop request to stop executing the print job;

a selecting unit configured to select a stopping method among (i) a first stopping method to stop executing the print job immediately after the accepting unit accepts the stop request, and (ii) a second stopping method to stop executing the print job after completion of printing the plurality of pages of a copy currently being printed when the stop request is accepted;

a controlling unit configured to control to stop executing the print job by the stopping method selected by the selecting unit in a case where the accepting unit accepts the stop request;

a changing unit configured to change a number of copies set in the print job in a case where the controlling unit controls to stop executing the print job by the second stopping method selected by the selecting unit; and wherein the controlling unit controls to restart executing the print job in accordance with the number of copies changed by the changing unit.

2. The printing apparatus according to claim 1, further comprising: a display controlling unit configured to control to display a number of copies that have already printed by executing the print job, in a case where the controlling unit controls to stop executing of the print job by the second stopping method selected by the selecting unit.

3. The printing apparatus according to claim 1, wherein the controlling unit controls to stop executing of the print job by the first stopping method, in a case where the print job is for one copy.

4. The printing apparatus according to claim 1, further comprising: an input unit configured to input a instruction for restarting executing of the print job in a case where the controlling unit controls to stop executing of the print job by the second stopping method selected by the selecting unit, and wherein the controlling unit controls to restart executing of the print job stopped by the stopping method in a case where the input unit inputs the instruction.

5. A printing apparatus comprising:

a printing unit configured to execute a print job, wherein the print job is for printing a plurality of copies of a plurality of pages;

an accepting unit configured to accept a stop request to stop executing the print job;

a selecting unit configured to select a stopping method among (i) a first stopping method to stop executing the print job immediately after the accepting unit accepts the stop request, and (ii) a second stopping method to stop executing the print job after completion of printing the plurality of pages of a copy currently being printed when the stop request is accepted;

a controlling unit configured to control to stop executing the print job by the stopping method selected by the selecting unit in a case where the accepting unit accepts the stop request; and a setting unit configured to set a number of copies to be printed after restart executing the print job in the case where the controlling unit controls to stop executing the print job by the second stopping method selected by the selecting unit;

wherein the controlling unit controls to restart executing the print job in accordance with the number of copies set by the setting unit.

6. The printing apparatus according to claim 5, further comprising: a display controlling unit configured to control to display a number of copies that have already printed by executing the print job, in a case where the controlling unit controls to stop executing of the print job by the second stopping method selected by the selecting unit.

7. The printing apparatus according to claim 5, wherein the controlling unit controls to stop executing of the print job by the first stopping method, in a case where the print job is for one copy.

8. The printing apparatus according to claim 5, further comprising: an input unit configured to input a instruction for restarting executing of the print job in a case where the controlling unit controls to stop executing of the print job by the second stopping method selected by the selecting unit, and wherein the controlling unit controls to restart executing of the print job stopped by the stopping method in a case where the input unit inputs the instruction.

9. A printing method executed in a printing apparatus, the method comprising the steps of:

executing a print job, wherein the print job is for printing a plurality of copies of a plurality of pages;

accepting a stop request to stop executing the print job;

selecting a stopping method among (i) a first stopping method to stop executing the print job immediately after the accepting step accepts the stop request, and (ii) a second stopping method to stop executing the print job after completion of printing the plurality of pages of a copy currently being printed when the stop request is accepted;

controlling to stop executing the print job by the stopping method selected by the selecting step in a case where the accepting step accepts the stop request; and changing a number of copies set in the print job in a case where the controlling step controls to stop executing the print job by the second stopping method selected by the selecting step;

wherein the controlling step controls to restart executing the print job in accordance with the number of copies changed by the changing step.

10. A non-transitory computer-readable medium storing a program causing a computer to:

execute a print job, wherein the print job is for printing a plurality of copies of a plurality of pages;

accept a stop request to stop executing the print job;

select a stopping method among (i) a first stopping method to stop executing the print job immediately after the accepting step accepts the stop request, and (ii) a second stopping method to stop executing the print job after completion of printing the plurality of pages of a copy currently being printed when the stop request is accepted;

control to stop executing the print job by the stopping method selected by the selecting step in a case where the accepting step accepts the stop request; and change a number of copies set in the print job in a case where the controlling step controls to stop executing the print job by the second stopping method selected by the selecting step;

wherein the controlling step controls to restart executing the print job in accordance with the number of copies changed by the changing step.

11. A printing method executed in a printing apparatus, the method comprising the steps of:

executing a print job, wherein the print job is for printing a plurality of copies of a plurality of pages;

accepting a stop request to stop executing the print job;

selecting a stopping method among (i) a first stopping method to stop executing the print job immediately after the accepting step accepts the stop request, and (ii) a second stopping method to stop executing the print job after completion of printing the plurality of pages of a copy currently being printed when the stop request is accepted;

controlling to stop executing the print job by the stopping method selected by the selecting step in a case where the accepting step accepts the stop request;

setting a number of copies to be printed after restart executing the print job in the case where the controlling step controls to stop executing the print job by the second stopping method selected by the selecting step; and wherein the controlling step controls to restart executing the print job in accordance with the number of copies set by the setting step.

12. A non-transitory computer-readable medium storing a program causing a computer to:

execute a print job, wherein the print job is for printing a plurality of copies of a plurality of pages;

accept a stop request to stop executing the print job;

select a stopping method among (i) a first stopping method to stop executing the print job immediately after the accepting step accepts the stop request, and (ii) a second stopping method to stop executing the print job after completion of printing the plurality of pages of a copy currently being printed when the stop request is accepted;

control to stop executing the print job by the stopping method selected by the selecting step in a case where the accepting step accepts the stop request;

set a number of copies to be printed after restart executing the print job in the case where the controlling step controls to stop executing the print job by the second stopping method selected by the selecting step; and wherein the controlling step controls to restart executing the print job in accordance with the number of copies set by the setting step.

* * * * *